US010922394B2

(12) United States Patent
Han et al.

(10) Patent No.: US 10,922,394 B2
(45) Date of Patent: Feb. 16, 2021

(54) ELECTRONIC DEVICE INCLUDING FINGERPRINT SENSOR AND METHOD FOR OPERATING THE SAME

(71) Applicant: Samsung Electronics Co., Ltd., Suwon-si (KR)

(72) Inventors: Min-Seok Han, Seoul (KR); Min-Jin Rho, Seoul (KR); Min-Shik Sohn, Seoul (KR); Sang-Gon Song, Suwon-si (KR); Ye-Nah Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 16/002,525

(22) Filed: Jun. 7, 2018

(65) Prior Publication Data
US 2019/0294770 A1    Sep. 26, 2019

(30) Foreign Application Priority Data
Mar. 23, 2018    (KR) .......................... 10-2018-0034108

(51) Int. Cl.
*G06F 21/32*    (2013.01)
*G06F 21/36*    (2013.01)
(Continued)

(52) U.S. Cl.
CPC .............. *G06F 21/32* (2013.01); *G06F 21/36* (2013.01); *G06F 3/0484* (2013.01); *G06F 3/04883* (2013.01); *G06K 9/00087* (2013.01)

(58) Field of Classification Search
CPC .... G06F 3/0484–04842; G06F 3/0488–04886; G06F 21/32; G06F 21/36;
(Continued)

(56) References Cited

U.S. PATENT DOCUMENTS

2012/0268389 A1* 10/2012 Yaron .................... G06F 3/0233
345/173
2016/0140379 A1* 5/2016 Pedersen ............. H04L 63/0861
726/19
(Continued)

FOREIGN PATENT DOCUMENTS

KR    10-0823871 B1    4/2008
KR    10-2017-0003193 A    1/2017
(Continued)

*Primary Examiner* — Kevin Bechtel
(74) *Attorney, Agent, or Firm* — Jefferson IP Law, LLP

(57) ABSTRACT

An electronic device is provided. The electronic device includes a display, a fingerprint sensor disposed corresponding to a first area of the display, a touchscreen panel disposed corresponding to the display, and a processor configured to receive information about a position of a first touch input for setting up first security information for unlocking from the touchscreen panel, identify the first security information based on, at least, the information about the position of the first touch input, and provide, through the display, a user interface for unlocking where at least one first visual item for designating at least a portion of the first security information is disposed on the first area of the display corresponding to a position of the fingerprint sensor. Other various embodiments are possible as well.

31 Claims, 28 Drawing Sheets

(51) Int. Cl.
    *G06F 3/0488* (2013.01)
    *G06F 3/0484* (2013.01)
    *G06K 9/00* (2006.01)

(58) Field of Classification Search
    CPC ....... H04L 9/3231; H04L 63/083–0846; H04L 63/0861
    See application file for complete search history.

(56) References Cited

U.S. PATENT DOCUMENTS

2017/0024597 A1* 1/2017 Cho .................. G06F 3/041
2017/0316400 A1* 11/2017 Venkatakrishnan ..................
                                                    G06Q 20/3674
2017/0336906 A1 11/2017 Yoon et al.

FOREIGN PATENT DOCUMENTS

KR  10-2017-0093744 A  8/2017
KR  10-2017-0129476 A  11/2017

* cited by examiner

ELECTRONIC DEVICE INCLUDING FINGERPRINT SENSOR AND METHOD FOR OPERATING THE SAME

CROSS-REFERENCE TO RELATED APPLICATION(S)

This application is based on and claims priority under 35 U.S.C. § 119(a) of a Korean patent application number 10-2018-0034108, filed on Mar. 23, 2018, in the Korean Intellectual Property Office, the disclosure of which is incorporated by reference herein in its entirety.

BACKGROUND

1. Field

The disclosure relates to electronic devices including fingerprint sensors and methods for operating the same. More particularly, the disclosure relates to electronic devices including fingerprint sensors for sensing fingerprints on their touchscreen and methods for operating the same.

2. Description of Related Art

More and more services and additional functions are being provided through smartphones or other portable electronic devices. To meet the needs of various users and raise use efficiency of electronic devices, communication service carriers or device manufacturers are jumping into competitions to develop electronic devices with differentiated and diversified functionalities.

As electronic devices come up with better capability, various biometric recognition techniques are being applied to electronic devices. Fingerprint recognition is most widely used among those biometric recognition technologies. Fingerprint perception-based user authentication provides superior security and simplified use.

Electronic devices may include a touchscreen capable of sensing touches by, e.g., a finger. Electronic devices may include a fingerprint sensor in a position corresponding to at least a portion of the touchscreen. Electronic devices are able to sense fingerprints on the touchscreen.

Electronic devices may adopt two-factor authentication for stronger security purposes. Electronic devices may perform authentication by, e.g., comparing fingerprints or patterns entered on the touchscreen. Electronic devices may also perform additional authentication by sensing biometric information, e.g., fingerprint information, and comparing the sensed biometric information with stored biometric information. Electronic devices may provide security-related features, e.g., unlocking, upon successful multi-factor authentication. However, electronic devices need to sequentially offer interfaces for multiple-factor authentication, causing the authentication to take too long. Implementing multiple interfaces may result in a waste of resources and user inconvenience.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide the advantages described below. Accordingly, an aspect of the disclosure is to provide an apparatus and method for user interface through which fingerprint information may be obtained upon entry of security information through the touchscreen based on the security information stored.

Additional aspects will be set forth in part in the description which follows and, in part, will be apparent from the description, or may be learned by practice of the presented embodiments.

In accordance with an aspect of the disclosure, an electronic device includes a display, a fingerprint sensor disposed corresponding to a first area of the display, a touchscreen panel disposed corresponding to the display, and at least one processor configured to receive information about a position of a first touch input for setting up first security information for unlocking from the touchscreen panel, identify the first security information based at least in part on the information about the position of the first touch input, and provide, through the display, a user interface for unlocking, wherein the user interface for unlocking comprises at least one first visual item for designating at least a portion of the first security information disposed on the first area of the display corresponding to a position of the fingerprint sensor.

In accordance with an aspect of the disclosure, a method for operating an electronic device including a display, a fingerprint sensor disposed corresponding to a first area of the display, and a touchscreen panel disposed corresponding to the display includes identifying first security information based at least in part on information about a position of a first touch input for setting up the first security information, the first security information for unlocking and identified by the touchscreen panel and providing, through the display, a user interface for unlocking, wherein the user interface for unlocking comprises at least one first visual item for designating at least a portion of the first security information disposed on the first area of the display corresponding to a position of the fingerprint sensor.

In accordance with an aspect of the disclosure, an electronic device includes a communication module, a display, a fingerprint sensor disposed corresponding to a first area of the display, a touchscreen panel disposed corresponding to the display, and at least one processor configured to receive, through the communication module, first information about a first screen including a first object for triggering a security function received from a server, provide, through the display, the first screen including the first object based on the first information, transmit, through the communication module to the server, a request for a second screen for entering first security information associated with the security function in response to detecting a designation of the first object identified based on information from the touchscreen panel, receive, from the server through the communication module, second information about the second screen, wherein at least one first visual item for designating at least a portion of the first security information is disposed on the first area of the display corresponding to a position of the fingerprint sensor, and provide, through the display, the second screen, wherein the second screen comprises the at least one first visual item for designating the at least a portion of the first security information is disposed on the first area of the display corresponding to the position of the fingerprint sensor, based on the second information.

In accordance with an aspect of the disclosure, a method for operating an electronic device including a communication module, a display, a fingerprint sensor disposed corresponding to a first area of the display, and a touchscreen panel disposed corresponding to the display includes receiving, through the communication module, first information about a first screen including a first object for triggering a security function received from a server, providing, through the display, the first screen including the first object based on the first information, transmitting, through the communication module to the server, a request for a second screen for entering first security information associated with the security function in response to detecting a designation of the first object identified based on information from the touchscreen panel, receiving, from the server through the communication module, second information about the second screen, wherein at least one first visual item for designating at least a portion of the first security information is disposed on the first area of the display corresponding to a position of the fingerprint sensor, and providing, through the display, the second screen, wherein the second screen comprises the at least one first visual item for designating the at least a portion of the first security information is disposed on the first area of the display corresponding to the position of the fingerprint sensor, based on the second information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claim are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Figure 1:
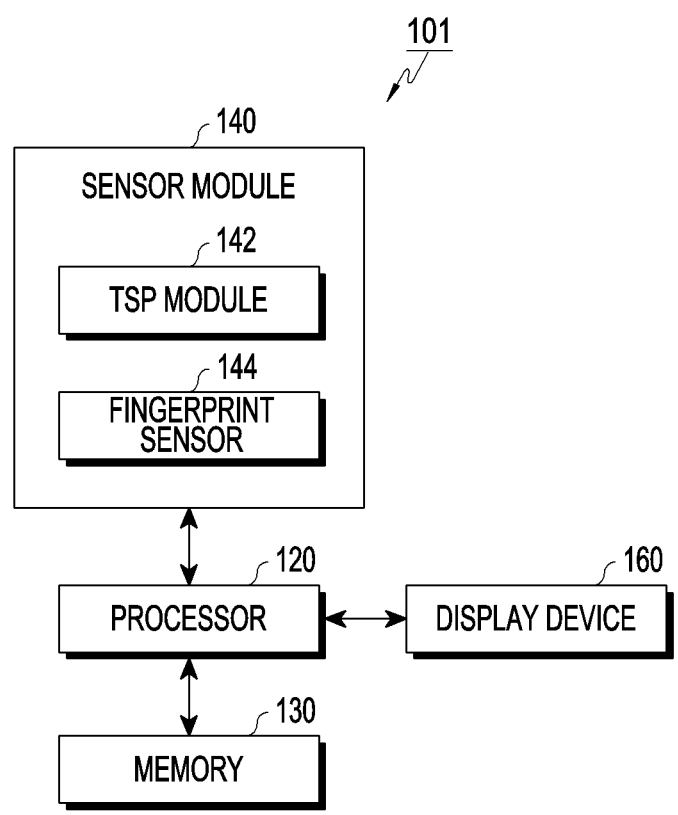
FIG. 1 is a block diagram illustrating an electronic device according to an embodiment of the disclosure.

It is to be understood that the singular forms "a," "an," and "the" include plural referents unless the context clearly dictates otherwise. Thus, for example, reference to "a component surface" includes reference to one or more of such surfaces. FIG. 1 is a block diagram illustrating an electronic device according to an embodiment of the disclosure.

Referring to FIG. 1, an electronic device 101 may include a display device 160, a sensor module 176, a memory 130, and a processor 120.

The display device 160 may output data or signals as images or videos. According to an embodiment of the disclosure, the display device 160 may output data or signals received from the memory 130 or sensor module 140 as images or videos according to control signals from the processor 120. According to an embodiment of the disclosure, the display device 160 may display a user interface through which security information (e.g., a password or pattern) for unlocking may be entered or an interference with a keyboard capable of entry of security information such as an identity (ID) or password. The display device 160 may also be referred to as a display.

According to an embodiment of the disclosure, the display device 160 may include a liquid crystal display (LCD) or an organic light emitting diode (OLED). According to an embodiment of the disclosure, the display device 160 may be electrically or operably combined with a TSP module 222 capable of receiving the user's touch inputs and a fingerprint sensor 144 for obtaining information about the user's fingerprints related to touch inputs.

According to an embodiment of the disclosure, the sensor module 140 may receive data for determining a context related to the inside or outside of the electronic device 101. The sensor module 140 may be configured to be integrated with various sensors (e.g., a grip sensor, a proximity sensor, a geo-magnetic sensor, a gyro sensor, an illuminance sensor, an air-pressure sensor, a pressure sensor, a touch sensor, or a biometric recognition sensor). For example, the sensor module 140 may transmit data about the external context related to the user to the processor 120.

According to an embodiment of the disclosure, the sensor module 140 may include a TSP module 142 and a fingerprint sensor 144.

The TSP module 142 may receive data related to the user's touch input. According to an embodiment of the disclosure, the TSP module 142 may sense touch inputs by a finger or a pen. The touch inputs may include a touch-and-release, a drag-and-drop, a long touch, or a force touch. According to an embodiment of the disclosure, the TSP module 142 may receive information regarding the area where the user's touch is entered or the position of the user's touch in the display. According to an embodiment of the disclosure, the TSP module 142 may output the information about the position and area of the user's touch to the processor 120 or store the information in the memory 130. The processor 120 may identify entered security information (e.g., a password, pattern, or text) based on the touch input-related information received from the TSP module 142. The processor 120 may compare the entered security information with security information stored in the memory 130 and perform first authentication based on a result of the comparison. The processor 120 may further compare fingerprint information obtained through the fingerprint sensor 144 with fingerprint information stored in the memory 130 and perform second authentication based on a result of the comparison. The processor 120 may perform authentication based on, at least, the first authentication result and the second authentication result.

For example, the TSP module 142 may be disposed corresponding to the position of the display device 160 in which case the TSP module 142 and the display device 160 may configure a touchscreen. Further, the fingerprint sensor 144 may be disposed in a position corresponding to at least a portion of the TSP module 142. Accordingly, while the TSP module 142 senses the information about the finger's position, the fingerprint sensor 144 may sense the fingerprint information. As described below in greater detail, the processor 120 may display, e.g., at least one visual item (e.g., icons, objects, or keyboard keys) included in the user interface, at the position of the fingerprint sensor 144. Accordingly, while the user touches the visual item, the fingerprint sensor 144 may sense fingerprint information. The processor 120 may display a visual item corresponding to at least a portion of the security information at the position of the fingerprint sensor 144 based on security information previously stored in the memory 130. For example, where the security information is a password "1234," an "icon for designating number 1" which corresponding to at least a portion, e.g., "1," of the password "1234," may be displayed at the position of the fingerprint sensor 144. Accordingly, the fingerprint sensor 144 may sense the fingerprint information while the user consecutively touches, e.g., an "icon for designating number 1," an "icon for designating number 2," an "icon for designating number 3," and an "icon for designating number 4," among a plurality of icons for entry of numbers displayed on the touchscreen.

The fingerprint sensor 144 may receive the fingerprint information through the user's touch input. The fingerprint sensor 144 may receive the fingerprint information to determine whether the user related to the touch input is an authenticated user depending on the distinct pattern of valleys and ridges of the user's fingerprint. According to an embodiment of the disclosure, the fingerprint sensor 144 may be operated in an optical scheme that is based on differences between light reflections on the valleys and light reflections on the ridges of the fingerprint, an ultrasonic scheme that is based on differences in phase between ultrasonic reflections on the valleys and ultrasonic reflections on the ridges of the fingerprint, or a capacitive scheme that is based on differences in permittivity between the valleys and ridges of the fingerprint.

According to an embodiment of the disclosure, the memory 130 may retain commands to control the electronic device 101, control command code, control data, or user data. For example, the memory 130 may include applications, an operating system (OS), middleware, and device drivers. The memory 130 may store, e.g., security information (e.g., a password or pattern) for unlocking. The pattern information may be information related to the order of designating multiple objects arrayed in a grid pattern. Further, the memory 130 may store fingerprint information. The memory 130 may provide security information and fingerprint information for unlocking at a request from the processor 120.

According to an embodiment of the disclosure, the memory 130 may include one or more of volatile memories or non-volatile memories. Volatile memories may include dynamic random-access memories (DRAMs), static RAMs (SRAMs), synchronous DRAMs (SDRAMs), phase-change RAMs (PRAMs), magnetic RAMs (MRAMs), resistive RAMs (PRAMs), or ferroelectric RAMs (FeRAMs). Non-volatile memories may include read-only memories (ROMs), programmable ROMs (PROMs), erasable PROMs (EPROMs), electrically erasable and programmable ROMs (EEPROMs), and flash memories. The memory 130 may include non-volatile media, such as hard disk drives (HDDs), solid state disks (SSDs), embedded multi-media cards (eMMCs), or universal flash storage (UFS). According to an embodiment of the disclosure, the memory 130 may retain a security area that stores information associated with the user's body such as fingerprint information or security information for unlocking.

According to an embodiment of the disclosure, the memory 130 may provide the stored data based on a request from the processor 120 or other component (e.g., the TSP module 142) or may record and store data received from the processor 120 or other component (e.g., the TSP module 142).

According to an embodiment of the disclosure, the processor 120 may control the overall operation of the electronic device 101. For example, the processor 120 may read or write data from/to the memory 130 or execute application command codes stored in the memory 130. For example, the processor 120 may perform first authentication to compare security information identified through a touch input with security information stored in the memory 130 and second authentication to compare the fingerprint information identified through the touch input with the security information stored in the memory 130.

As another example, the processor 120 may display various types of information through the display device 160. As set forth above, the processor 120 may display visual items (e.g., icons for designating numbers, icons for designating letters, or objects for inputting a pattern) for designating at least a portion of the security information on an area where the fingerprint sensor 144 is located. Accordingly, while the user touches the visual item, the fingerprint sensor 144 may sense fingerprint information. The TSP module 142 may sense information about the position of the touch. The processor 120 may identify the entered security information based on the information about the position of the touch. The processor 120 may perform authentication based on, at least, whether the identified security information and sensed fingerprint information, respectively, correspond to the stored security information and the stored fingerprint information.

According to an embodiment of the disclosure, the whole or part of the processor 120 may be electrically or operably combined or connected with other components (e.g., the display device 160, the sensor module 140, or the memory 130) of the electronic device 101. According to an embodiment of the disclosure, the processor 120 may be configured of one or more processors. For example, the processor 120 may include an application processor to control higher layer programs, such as applications or a communication processor to control communication with other electronic devices.

Figure 2:
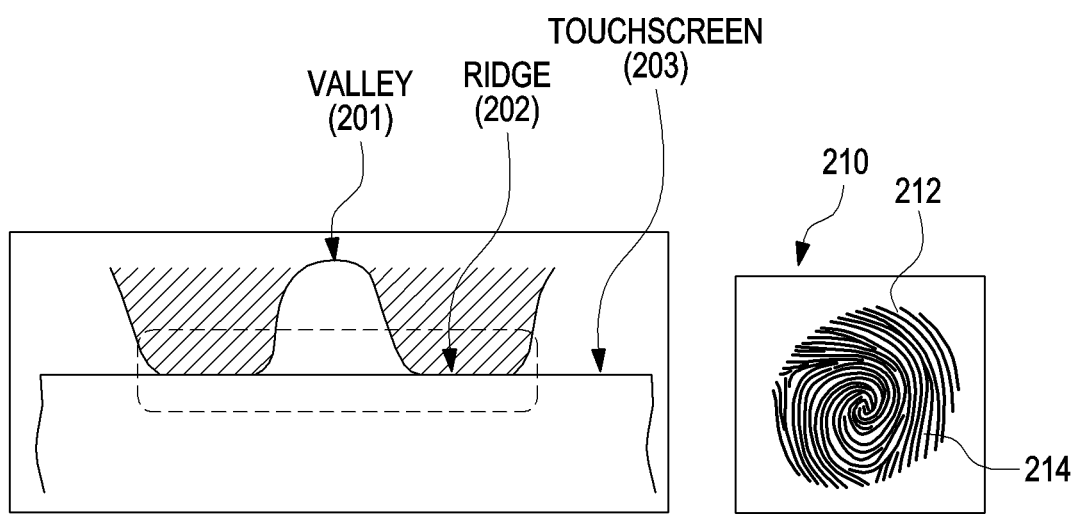
FIG. 2 is a view illustrating a process for obtaining fingerprint information according to an embodiment of the disclosure.

FIG. 2 is a view illustrating a process for obtaining fingerprint information according to an embodiment of the disclosure.

Referring to FIG. 2, a user's fingerprint may include a ridge 202 which corresponds to a relatively lower position with respect to a touch surface of a touchscreen 203 (e.g., the display device 160 of FIG. 1) and a valley 101 which corresponds to a relatively higher position with respect to the touch surface of the touchscreen 203. Where the user's finger touches the touchscreen 203, the ridge 202 of the fingerprint may physically contact the touchscreen 203. In contrast, where the user's finger touches the touchscreen 203, the valley 201 of the fingerprint, which is positioned relatively higher than the touch surface of the touchscreen 203, may not come in physical contact with the touchscreen 203. Accordingly, an air layer may be formed between the valley 201 of the fingerprint and the touchscreen 203. Since the ridge 202 of the fingerprint physically contacts the touchscreen 203, no air layer may be formed between the ridge 202 and the touchscreen 203.

According to an embodiment of the disclosure, the processor 120 may obtain the fingerprint's image 210 through the fingerprint sensor 144 upon the user's touch input. The image 210 may include a first area 212 indicated in a first color (e.g., black) and a second area 214 indicated in a second color (e.g., white). The first area 212 may denote the ridge 202, and the second area 214 may denote the valley 201. The processor 120 may compare the obtained image 210 with an image previously stored and may perform authentication based on a match ratio between the two images. The processor 120 may use a typical fingerprint comparing scheme without being limited as adopting a particular fingerprint comparing scheme.

Figure 3A:
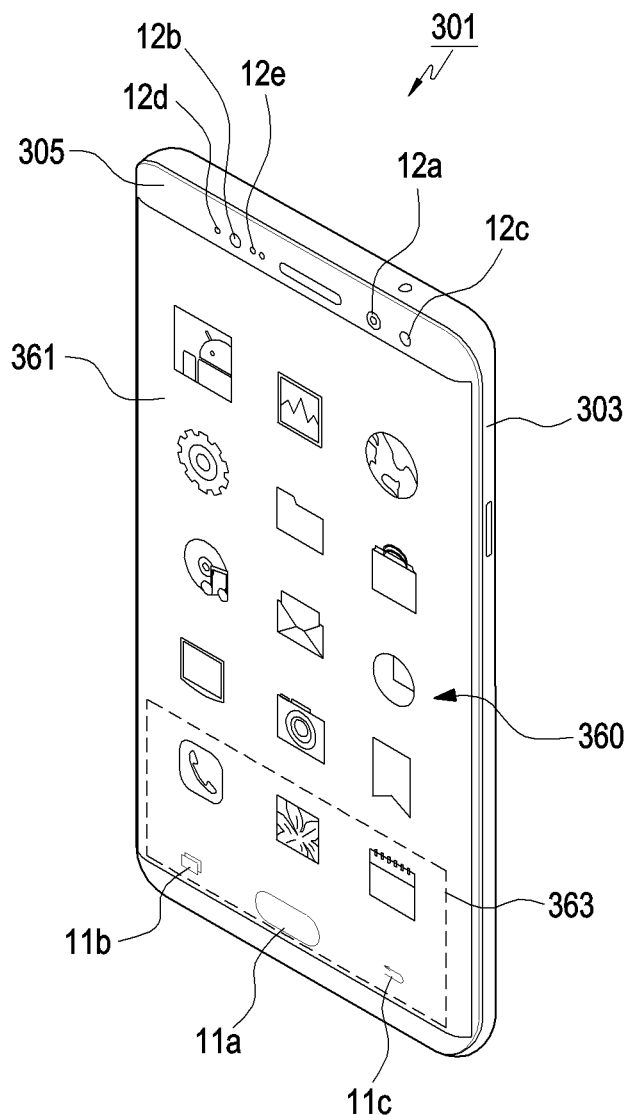
FIG. 3A is a perspective view illustrating an electronic device according to an embodiment of the disclosure.

FIG. 3A is a perspective view illustrating an electronic device according to an embodiment of the disclosure.

Figure 3B:
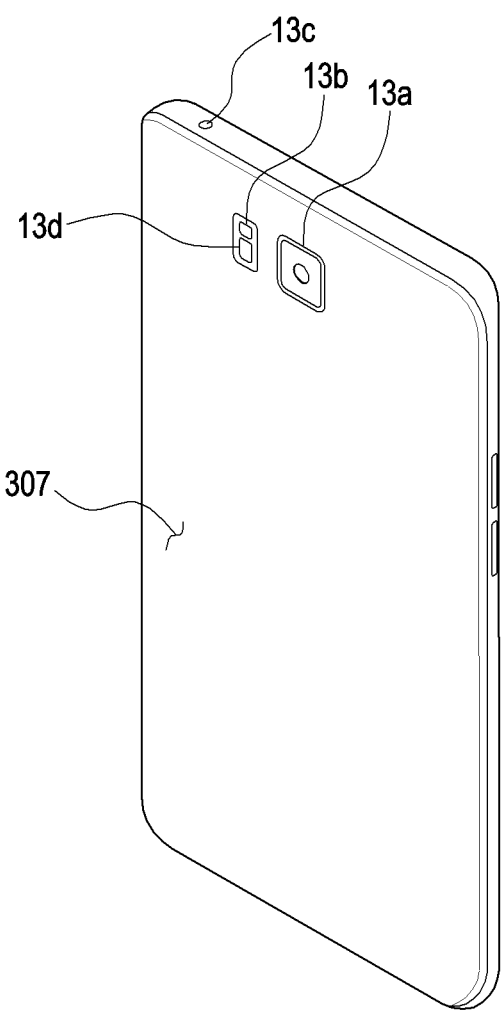
FIG. 3B is a perspective view illustrating an electronic device as viewed in a different direction according to an embodiment of the disclosure.

FIG. 3B is a perspective view illustrating an electronic device as viewed in a different direction according to an embodiment of the disclosure.

Referring to FIGS. 3A and 3B, an electronic device 301 (e.g., the electronic device 101) may include a housing 303 and a display 360 (e.g., the display device 160). The housing 303 may include a front surface 305, or a first surface, facing in a first direction and a rear surface 307, or a second surface, facing in a second direction opposite to the first direction. The rear surface 307 of the housing 303 may be a rear cover.

At least a portion of the front surface 305 of the housing 303 may have an opening. The display 360 may include a transparent cover 361 (or a window or cover glass). The display 360 may be mounted in the housing 303 so that the cover 361 forms at least a portion of the front surface 305 of the electronic device 301/housing 303. The cover 361 may be disposed to close the opening of the front surface 305 of the housing 303.

According to an embodiment of the disclosure, the electronic device 301 may include mechanically-operated buttons, touch keys 11a, 11b, and 11c or a keypad including at least one of the buttons or touch keys on the front surface 305 of the housing 303 or on a side of the display 360 The touch keys 11a, 11b, and 11c may detect the user's touch inputs.

The housing 303 may receive various electronic parts. The housing 303 may be at least partially formed of a conductive material. The housing 303 may include side walls forming the outer surface of the electronic device 301. A printed circuit part (not shown) and/or a battery (e.g., the battery 189) may be received inside the housing 303. For example, at least one of a processor (e.g., the processor 120), a communication module, various interfaces, or a power management module may be mounted on the printed circuit part (not shown) in the form of an integrated chip (IC).

According to an embodiment of the disclosure, the electronic device 301 may include a first camera 12a (e.g., the camera module 180), a light source 12b, or an iris camera 12c on an upper portion of the front surface. For example, the light source 12b may include an infrared (IR) light emitting diode (LED). The iris camera 12c may capture the user's eye or iris irradiated with a red near-infrared ray output from the IR LED.

According to an embodiment of the disclosure, the electronic device 301 may include a light source indicator lamp 12d, an illuminance sensor, and/or a proximity sensor 12e on the upper portion of the front surface.

According to an embodiment of the disclosure, the electronic device 301 may include a second camera 13a (e.g., the camera module 180), a heart rate monitor (HRM) 13d, and/or a flash 13b on the rear surface 307. The electronic device 301 may include a microphone 13c on the top.

The display 360 may be exposed through the front surface 305 of the housing 303. The display 360 may include a cover 361 and a display panel. According to an embodiment of the disclosure, the display 360 may include a touch panel between the cover 361 and the display panel. The display 360 may output a home screen or application screens. The display 360 may detect touch inputs on the home screen or the application screens.

According to an embodiment of the disclosure, the electronic device 301 may include a rear cover to protect the rear surface 307 of the housing 303. The rear cover may be mounted on the housing 303 to face in the opposite direction (the second direction) of the display 360. The rear cover, together with the housing 303 and the display 360, may form the outer appearance of the electronic device 301.

According to an embodiment of the disclosure, at least a portion of an active area (or area where display pixels are actually arranged or an area to display screens) of the display 360 or a fingerprint sensor area 363 may be provided as a fingerprint sensor, or its portion, for recognizing fingerprints. Although FIG. 3A illustrates an example in which a lower area of the display 360 is set as the fingerprint sensor area 363, this is merely an example. It would readily be appreciated by one of ordinary skill in the art that the fingerprint sensor area 363 is not limited in position, size, or shape. Further, according to an embodiment of the disclosure, the electronic device 101 may include a plurality of fingerprint sensors in which case there may be a plurality of fingerprint sensor areas 363.

Figure 4:
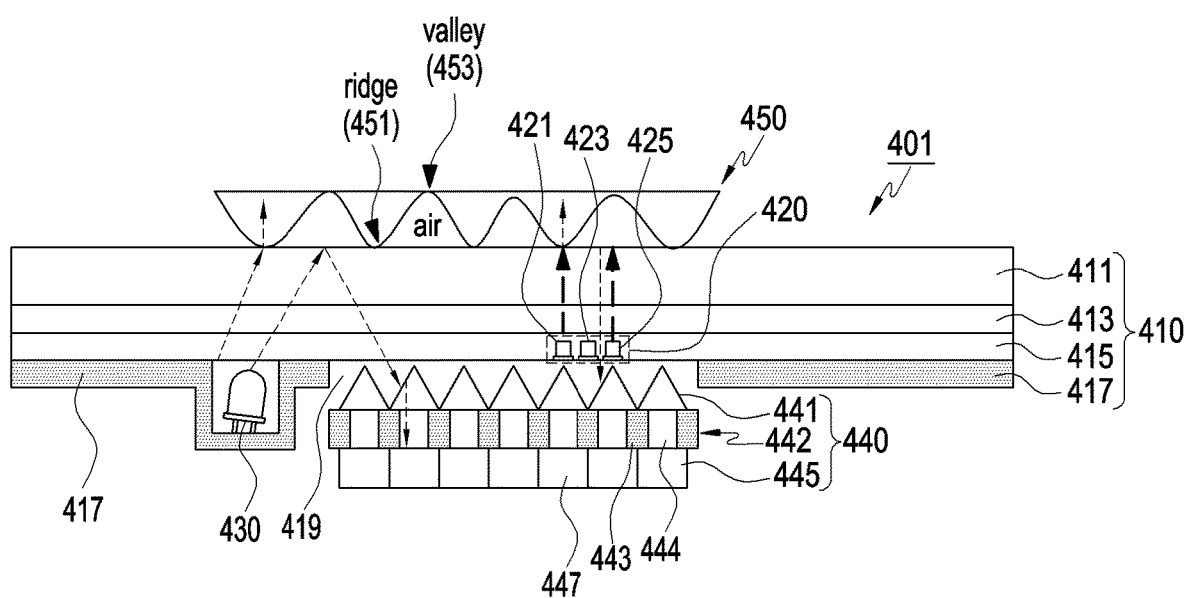
FIG. 4 is a view illustrating an electronic device including a fingerprint sensor capable of sensing fingerprints and located on at least a portion of a touchscreen panel (TSP), according to an embodiment of the disclosure.

FIG. 4 is a view illustrating an electronic device including a fingerprint sensor capable of sensing fingerprints and located on at least a portion of a TSP, according to an embodiment of the disclosure.

Referring to FIG. 4, an electronic device 401 (e.g., the electronic device 101 or 301) may include a display 410 (e.g., the display device 160 or the display 360), fingerprint sensor 440 (e.g., a fingerprint sensor disposed in the fingerprint sensor area 363), and a light source 430. A portion (e.g., the fingerprint sensor area 363) of the display 410 shown in FIG. 4 may be included in the fingerprint sensor 440 of the electronic device 401.

According to an embodiment of the disclosure, the fingerprint sensor 440 may correspond to a portion of the display 410.

According to an embodiment of the disclosure, the display 410 may include a transparent cover 411 (e.g., the cover 361), a display panel 415 attached onto the cover 411 via an adhesive 413, and a shock-absorbing device 417. The cover 411 may also be referred to hereinafter as a transparent member, window, or cover glass.

The cover 411 may be disposed on the front surface of the electronic device 401 or housing (e.g., the housing 303) or may be disposed to form at least a portion of the front surface.

The shock-absorbing device 417 may be overlaid on the surface (or second surface) of the display panel 415 that faces the fingerprint sensor 440. The shock-absorbing device 417 may include an opening 419 in a position corresponding to the fingerprint sensor 440.

The display panel 415 may include a plurality of pixels arrayed in a matrix structure of M rows and N columns. FIG. 4 illustrates one pixel 420 for illustration purposes. Each pixel 420 may include a red (R) sub-pixel 421, a green (G) sub-pixel 423, and a blue (B) sub-pixel 425. The display panel 415 may be configured to allow each pixel to emit light to the cover 411 according to a selected combination of the RGB sub-pixels.

The light source 430 may be configured to emit light to the cover 411.

A fingerprint 450 may include a ridge 451 and a valley 453.

A portion of light emitted from the display panel 415 or light source 430 to the cover 411 may be absorbed by the ridge 451 of the fingerprint 450 that tightly contacts the surface of the cover 411.

Another portion of the light emitted from the display panel 415 or the light source 430 to the cover 411 may be reflected to the fingerprint sensor 440 by the border of the cover 411 and the air layer between the cover 411 and the valley 453.

The fingerprint sensor 440 may include at least one prism 441, at least one lens 442, and an image sensor 445.

According to an embodiment of the disclosure, the fingerprint sensor 440 may be attached to the shock-absorbing device 417 to cover the opening 419. According to an embodiment of the disclosure, the fingerprint sensor 440 may be wider than the opening 419, and the border of the fingerprint sensor 440 may be attached onto the surface (or second surface) of the shock-absorbing device 450 that faces the fingerprint sensor 440. By making the fingerprint sensor 440 wider than the opening 451, the user may not notice the fingerprint sensor 440.

According to an embodiment of the disclosure, the fingerprint sensor 440 may be disposed on the rear surface of the display panel 415 or the fingerprint 440 along with the pixels may be disposed inside the display panel 415.

The electronic device 401 or a processor (e.g., the processor 120) of the electronic device 401 may control the display panel 415 or light source 430 to emit light to the cover 411. The electronic device 401 or the processor of the electronic device 401 may detect light reflected from the surface of the cover 411, which is disposed to at least partially contact the fingerprint 450, using the fingerprint sensor 440. At least a portion of the detected light may represent a fingerprint image.

At least one prism 441 may be configured to deflect light, which is emitted from the display panel 415 or light source 430 and reflected from the surface of the cover 411 disposed to at least partially contact the fingerprint 450, to the image sensor 445.

At least one lens 442 may be configured to block at least a portion of the deflected light. At least one lens 442 may collimate, or make parallel, the deflected light beams. For example, at least one lens 442 may include at least one of a combination of a plurality of micro-lenses, a combination of optical fiber lenses, or a combination of a plurality of pinhole lenses.

According to an embodiment of the disclosure, at least one lens 442 may include a plurality of holes 444 and barriers 443 to define the holes 444.

According to an embodiment of the disclosure, the barriers 443 may have the characteristic of absorbing or reflecting incident light.

The image sensor 445 may be configured to detect light transmitted through at least one lens 442 as an image/image signal/image data.

Light emitted from the light source 430 may pass through the display panel 415 and the adhesive 413 to the surface of the cover 411 which at least partially contacts the fingerprint.

According to an embodiment of the disclosure, light emitted from the display panel 415 may pass through the TSP 413 having transparent electrodes to the surface of the cover 411 which at least partially contacts the fingerprint.

A portion of the light incident onto the ridge 451 of the fingerprint 450 that tightly contacts the surface of the cover 411 may be absorbed by the ridge 451 or the user's skin.

Another portion of the light incident onto the air layer between the valley 453 and the cover 411 may be reflected from the surface of the cover 411, which at least partially contacts the fingerprint, or the border of the cover 411 and the air layer between the valley 453 and the cover 411.

According to an embodiment of the disclosure, the fingerprint sensor 440 may include at least one prism 441 configured to deflect the light reflected from the surface of the cover 411 disposed to at least partially contact the fingerprint 450 to the image sensor 445, at least one lens 442 configured to block at least a portion of the deflected light, and the image sensor 445 configured to detect the light transmitted through the at least one lens 442.

According to an embodiment of the disclosure, the electronic device 401 may include a transparent cover 411, a light source 430 configured to emit light to the cover 411, at least one prism 441 configured to deflect the light reflected from the surface of the cover 411 disposed to at least partially contact the fingerprint to the image sensor 445, at least one lens 442 configured to block at least a portion of the deflected light, and the image sensor 445 configured to detect the light transmitted through the at least one lens 442.

According to an embodiment of the disclosure, the fingerprint sensor 440 may further include the transparent cover 411.

According to an embodiment of the disclosure, the light source 430 may be added that is configured to emit light to the cover 411.

According to an embodiment of the disclosure, the at least one lens 442 may be a lens sheet including a plurality of holes 444 and barriers 443 defining the plurality of holes 444.

According to an embodiment of the disclosure, the barriers 443 may have the characteristic of absorbing or reflecting incident light.

According to an embodiment of the disclosure, the image sensor 445 may include a plurality of pixels 447. The interval between the plurality of pixels 447 may be larger than 0 μm and not more than 50 μm.

According to an embodiment of the disclosure, the interval between the plurality of holes may be smaller than the interval between the pixels 447.

According to an embodiment of the disclosure, the light source 430 may include a plurality of pixels 447 included in the display 410 of the electronic device 401 including the fingerprint sensor 440.

According to an embodiment of the disclosure, the at least one prism 441 may be a prism sheet including a substrate and a plurality of prisms that protrude from one surface of the substrate.

According to an embodiment of the disclosure, the cross section of the at least one prism 441 which is perpendicular to the lengthwise direction or at least one surface of the at least one prism 441 may be shaped as an equilateral triangle, a right-angled triangle, or a trapezoid.

According to an embodiment of the disclosure, the at least one prism 441 may include a plurality of prism layers.

According to an embodiment of the disclosure, a shock-absorbing device 417 may be added that is disposed on one surface of the display 410 and has an opening 419. The fingerprint sensor 440 may be aligned with the opening 419.

According to an embodiment of the disclosure, the processor 120 may be configured to obtain a plurality of fingerprint images using a plurality of wavelengths of light, obtain the user's fingerprint information based on the plurality of fingerprint images, and determine whether the designated fingerprint information matches the obtained fingerprint information.

According to an embodiment of the disclosure, the processor 120 may be configured to determine whether the user's authentication succeeds or fails based on the determination.

According to an embodiment of the disclosure, the processor 120 may be configured to determine whether each position is of a ridge or valley based on the plurality of fingerprint information images and obtain the user's fingerprint information based on the plurality of fingerprint images and the determination.

According to an embodiment of the disclosure, the user's fingerprint information may include one of the plurality of fingerprint images or a fingerprint image restored from another fingerprint image.

According to an embodiment of the disclosure, the processor 120 may be configured to obtain a reference fingerprint image using reference light before obtaining the plurality of fingerprint images, determine whether the designated fingerprint image matches the obtained reference fingerprint image, and when they do not match, obtain the plurality of fingerprint images using the plurality of wavelengths of light.

According to an embodiment of the disclosure, the TSP 413 may identify the position of the touch (or approach) of the fingerprint 450, e.g., based on, at least, information about a change in the mutual-capacitance between the electrodes or the self-capacitance of the electrodes included. The processor 120 may accordingly identify the position of the contact of the fingerprint 450 together with information about the fingerprint 450.

Figure 5:
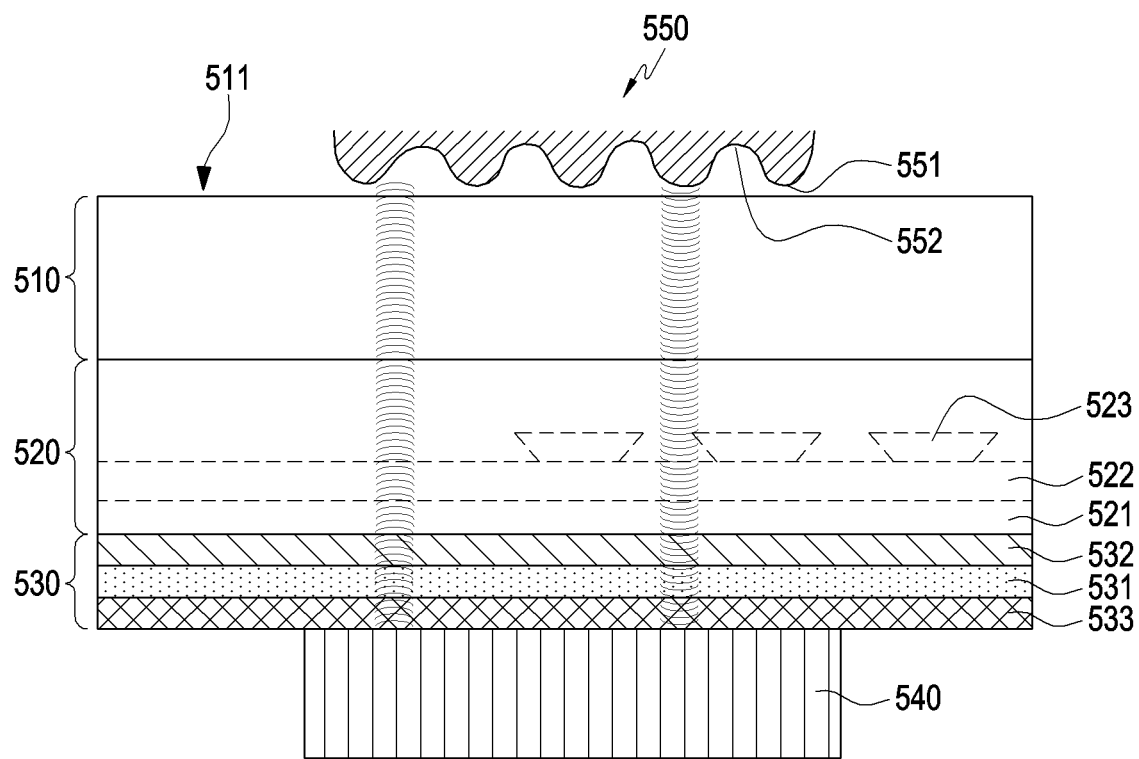
FIG. 5 is a view illustrating an electronic device including a fingerprint sensor capable of sensing fingerprints and located on at least a portion of a TSP, according to an embodiment of the disclosure.

FIG. 5 is a view illustrating an electronic device including a fingerprint sensor capable of sensing fingerprints and located on at least a portion of a TSP, according to an embodiment of the disclosure.

Referring to FIG. 5, according to an embodiment of the disclosure, a transparent member 510 (or a front housing) may transmit at least one light beam displayed on a display panel 520. The transparent member 510 may be formed of at least one of a high-molecular material, e.g., a polymer, such as polycarbonate (PC), polymethyl methacrylate (PMMA), polyimide (PE), polyethylene terephthalate (PET), or polypropylene terephthalate (PPT), or glass. According to an embodiment of the disclosure, the transparent member 510 may include a multi-layer structure formed of various materials.

According to an embodiment of the disclosure, the display panel 520 may include a base substrate 521, a thin film transistor (TFT) layer 522 formed on the base substrate 521, and a pixel layer 523 (or an organic light emitting layer) configured to receive signal voltages from the TFT layer 522. The TFT layer 522 may include an active layer, a gate insulating layer, a gate electrode, an inter-layer insulating layer, a source layer, and a drain electrode to deliver signals necessary for driving the pixel layer 523. The pixel layer 523 may include a plurality of display devices, e.g., LEDs. The pixel layer 523 may be defined as an area where a plurality of organic display devices are formed on the TFT layer 522. The display panel 520 may further include a thin film sealing layer configured to seal off the pixel layer 523, a back film to support the base substrate 521, or other proper components.

According to an embodiment of the disclosure, the transparent member 510 and the display panel 520 and the layers included therein may be attached together by use of an attaching member (or adhesive). The attaching member may include, e.g., double-sided film, a pressure sensitive adhesive (PSA), an optical clear adhesive (OCA), or an optical clear resin (OCR).

According to an embodiment of the disclosure, the light absorbing member 530 may include a base layer 531 formed of a polymer (e.g., PET) and a first adhesive layer 532 (or an upper adhesive layer) and a second adhesive layer 533 (or a lower adhesive layer) disposed on two opposite surfaces of the base layer 531. According to an embodiment of the disclosure, the light absorbing member 530 may include a black coat layer to prevent the inside (e.g., the fingerprint sensor 540) of the electronic device from being viewed through the transparent member 510 and the display panel 520, which is transparent when not operated, by the user. The light absorbing member 530 may also be referred to as an anti-view layer.

According to an embodiment of the disclosure, the fingerprint sensor 540 may be disposed under the stack of the transparent member 510, the display panel 520, and the light absorbing member 530. The fingerprint sensor 540 may be disposed under the light absorbing member 530 by the adhesivity of the second adhesive layer 533 of the light absorbing member 530. The light absorbing member 530 may prevent the fingerprint sensor 540 from being viewed by the user through the transparent member 510 and the display panel 520. The light absorbing member 530 may also prevent damage to the display panel 520 by absorbing impacts that may be applied to the display panel 520 upon attaching the fingerprint sensor 540 to the display panel 520 (or a stack including the display panel 520). Although not shown, a TSP including a transparent electrode may be disposed between the display panel 520 and the transparent member 510.

The fingerprint sensor 540 may send out ultrasonic waves with a designated frequency. The processor 120 operably connected with the fingerprint sensor 540 may provide a signal to enable the fingerprint sensor 540 to produce at least one ultrasonic wave. For example, while a user interface for entry of security information is provided through the display panel 520, the fingerprint sensor 540 may send out an ultrasonic wave.

In response to a signal from the processor, the fingerprint sensor 540 may produce at least one ultrasonic wave that is to be transferred to the exposed surface 511 of the transparent member 510. The ultrasonic wave may be a sound wave with a frequency of about 20,000 Hz or more that exceeds the audible frequency range. The ultrasonic wave delivered to the exposed surface 511 of the transparent member 510 may be reflected by the ridge 551 and valley 552 of the external object (e.g., the user's finger) 550.

The fingerprint sensor 540 may receive the ultrasonic wave reflected from the external object. The fingerprint sensor 540 may receive the reflected ultrasonic wave and convert the energy of the received ultrasonic wave into electric charges. The electric charges may be gathered by the pixel input electrodes of the fingerprint sensor 540 and delivered to the pixel circuits. The electric charges may be amplified by the pixel circuits.

The fingerprint sensor 540 may generate a fingerprint image corresponding to the external object based, at least, on the received ultrasonic wave. The fingerprint sensor 540 may output a digital signal to configure the image (e.g., fingerprint image) of the external object 550. The fingerprint sensor 540 may provide the digital signal to the processor. The processor may produce a fingerprint image using the digital signal. According to an embodiment of the disclosure, an application-specific integrated circuit (ASIC) for the fingerprint sensor 540 may produce a fingerprint image using the digital signal. The ASIC may provide the produced fingerprint image to the processor.

The processor 120 may perform security-related authentication based on the fingerprint image. For example, the processor may receive an output fingerprint image or a fingerprint image from the processor for the fingerprint sensor 540. The processor may compare the received fingerprint image with a reference image to perform fingerprint authentication. The reference image may include an image that is previously stored by an authenticated user of the electronic device and is intended for the authenticated user's fingerprint or an image registered for a fingerprint registration setting. The reference image may be stored in a security area of the memory 130 of the electronic device.

The transfer of a sound or sound wave may be based on the characteristics of a medium, e.g., acoustic impedance. A sound wave may be less transferred from one medium to another when a significant difference in acoustic impedance (or acoustic resistance) occurs between the media. "Less transferred" may mean that a majority of the incident wave cannot be transferred to the other medium but is rather reflected on the boundary surface between the two media. Accordingly, to well transfer the sound wave, an impedance matching between the media may be of significance.

Referring to FIG. 5, the ultrasonic wave may be delivered via composite media between the fingerprint sensor 540 and the exposed surface 511. In other words, the ultrasonic wave produced from the fingerprint sensor 540 and the ultrasonic reflection received by the fingerprint sensor 540 may be transferred through a composite stack of the transparent member 510, the display panel 520, and the light absorbing member 530. Each element of the transparent member 510, the display panel 520, and the light absorbing member 530 may be configured not to make a big difference in acoustic impedance with its adjacent element.

Figure 6A:
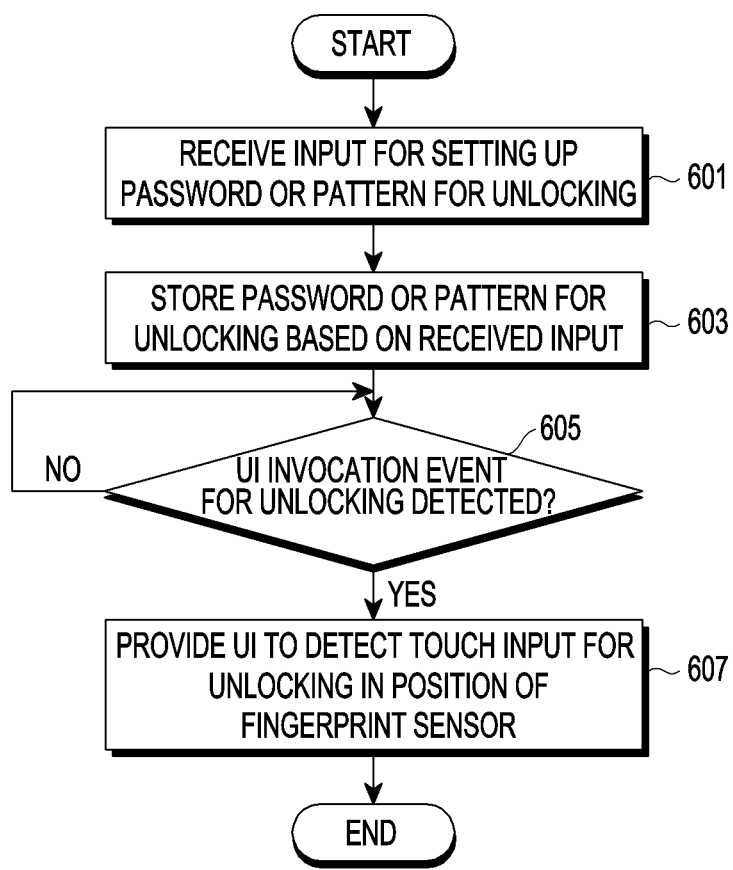
FIGS. 6A, 6B, and 6C are flowcharts illustrating a method for operating an electronic device according to an embodiment of the disclosure.

FIG. 6A is a flowchart illustrating a method for operating an electronic device according to an embodiment of the disclosure.

Referring to FIG. 6A, in operation 601, the electronic device 101 may receive an input for setting at least one of a password or pattern for unlocking. In operation 603, the electronic device 101 may store the password or pattern for unlocking based on the received input. As used herein, "electronic device 101 performs a particular process" may mean that the processor 120 of the electronic device 101 performs the particular process or controls other hardware component(s) to perform the particular process. "Electronic device 101 performs a particular process" may mean that a particular hardware component performs the particular process without being controlled by the processor 120. "Electronic device 101 performs a particular process" may mean that, as at least one command stored in the memory 130 of the electronic device 101 is executed, the processor 120 performs the particular process or controls other hardware component(s) to perform the particular process. For example, the electronic device 101 may provide through the display device 160 a user interface for setting up a pattern for unlocking or a user interface for setting up a password for unlocking. The user may touch at least one of icons for designating numbers included in the user interface provided through the display device 160, and the TSP 142 may identify the position of the touch and deliver the position to the processor 120. The processor 120 may identify and store a number designated by the user, i.e., security information, based on the position of each icon in the user interface and the position of touch received from the TSP 142. Or, the user may input a drag gesture to designate in order at least some of a plurality of objects in the user interface provided through the display device 160. The TSP 142 may identify the position of each touch of the drag gesture input and deliver the same to the processor 120. The processor 120 may identify and store a pattern designated by the user, i.e., security information, based on the position of each of the plurality of objects in the user interface and the positions of the consecutive touches received from the TSP 142.

In operation 605, the electronic device 101 may determine whether an event to invoke a user interface for unlocking is detected. For example, the electronic device 101 may enter a sleep mode to turn off the display device 160. Upon detecting an input to wake up the sleep mode (e.g., pressing an external button, touching at least a portion of the display, or entering a voice input), the electronic device 101 may provide the user interface for unlocking rather than immediately displaying the menu screen. It will readily be appreciated by one of ordinary skill in the art that the invocation event for unlocking is not limited to a particular one.

In operation 607, the electronic device 101 may provide, on the display device 160, a user interface for detecting a touch input for unlocking in the position of the fingerprint sensor 144. For example, where the password is "1234," a user interface may be provided that includes an icon for designating at least one number of the password is provided in the position of the fingerprint sensor 144. In a pattern entry scheme for consecutively designating at least some of nine objects, if the stored pattern is "first object→second object→fifth object→eighth object," there may be provided a user interface where at least one of the objects designated by the pattern is disposed in the position of the fingerprint sensor 144. The fingerprint sensor 144 may identify fingerprint information while a touch for unlocking is detected. Accordingly, where security information for unlocking is entered, the electronic device 101 may identify the security information for unlocking based on the position of the touch and may identify the fingerprint information as well.

As set forth above, at least one of the array, position, shape, or size of the visual items constituting the user interface may be determined according to the security information. For example, when the fingerprint sensor 144 is disposed to correspond to a first area of the display device 160, and the password is "1234," an icon for designating at least one of the numbers 1, 2, 3, and 4 may be displayed on the first area of the display device 160. However, where the password is "5678," an icon for designating at least one of the numbers 5, 6, 7, and 8 may be displayed on the first area of the display device 160. Accordingly, when the password is changed, the electronic device 101 may display a different user interface for unlocking.

Figure 6B:
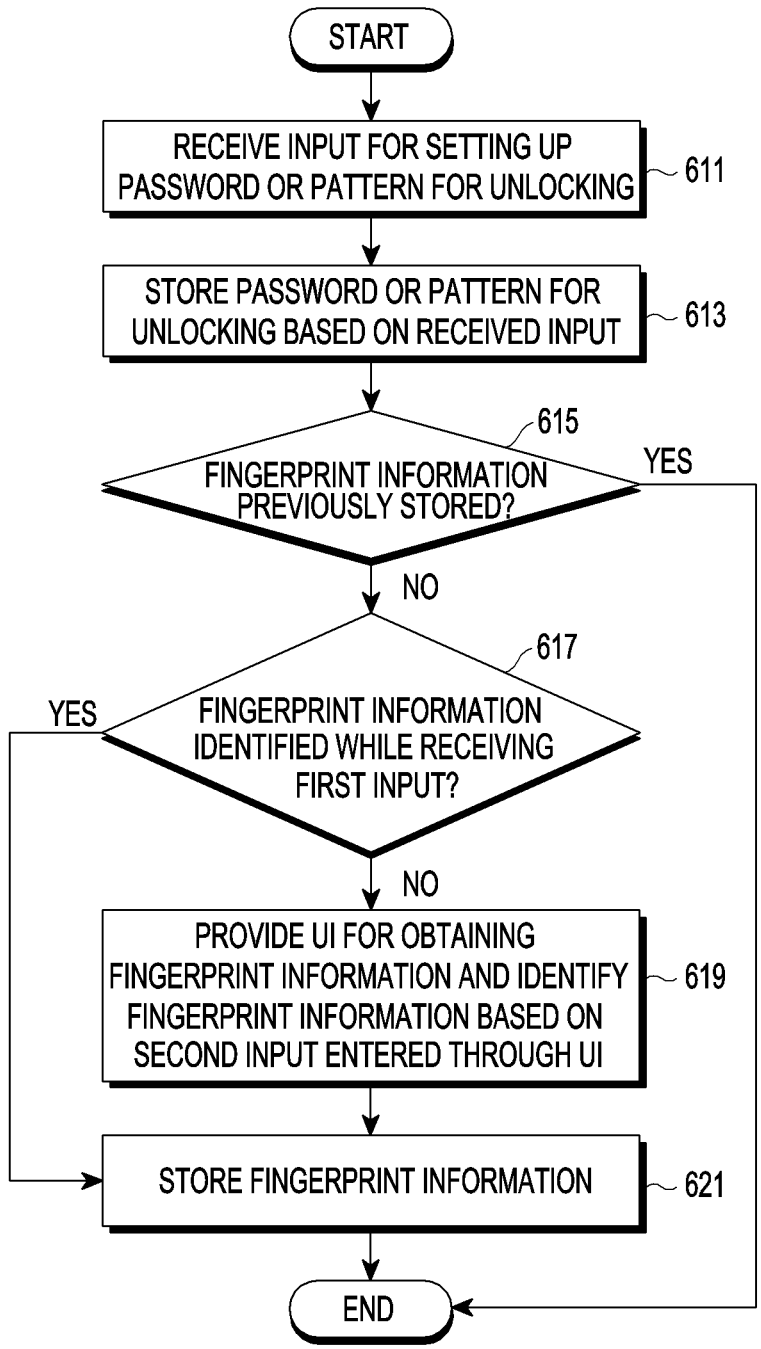

FIG. 6B is a flowchart illustrating a method for operating an electronic device according to an embodiment of the disclosure. FIG. 6B illustrates a method for setting up fingerprint information and security information for an electronic device.

Referring to FIG. 6B, according to an embodiment of the disclosure, in operation 611, the electronic device 101 may receive a first input for setting at least one of a password or pattern for unlocking. For example, the electronic device 101 may provide a user interface for setting up security information for unlocking. The user interface for setting up security information may include a plurality of icons for entry of a password or a plurality of objects for entry of a pattern. At least some of the plurality of icons or at least some of the plurality of objects may be displayed on an area where the fingerprint sensor 144 is positioned. The electronic device 101 may receive a plurality of single touch inputs or a continuous touch input on the user interface. In operation 613, the electronic device 101 may store the password or pattern for unlocking based on the received first input.

In operation 615, the electronic device 101 may identify whether fingerprint information is previously stored. For example, the electronic device 101 may identify whether the user's fingerprint information has been stored before security is set up. Unless the fingerprint information is previously stored, the electronic device 101 may identify whether fingerprint information is identified while the first input is received in operation 617. The electronic device 101 may activate the fingerprint sensor 144 while displaying the user interface for setting up security information for unlocking. Icons for designating the numbers constituting the password or objects for entering a pattern may be displayed on an area of the display device 160 corresponding to the position of the fingerprint sensor 144. For example, an "icon for designating the number 1" may be displayed on the area of the display device 160 corresponding to the position of the fingerprint sensor 144. In this case, where the user sets up a password including the number "1," the electronic device 101 may obtain the fingerprint information through the fingerprint sensor 144 while sensing the touch. However, where the user sets up a password not including the number "1," the electronic device 101 might not obtain the fingerprint information while sensing the touch.

Upon failure to identify the fingerprint information, the electronic device 101 may provide a user interface for obtaining fingerprint information and identify fingerprint information based on a second input entered to the user interface in operation 619. For example, the electronic device 101 may display, on the display device 160, an area that the user is supposed to touch with his finger, i.e., an area corresponding to the position of the fingerprint sensor 144. The user interface may further include at least one of a drawing or text to induce the user to touch with his finger.

Where the fingerprint information is identified according to the first input, the electronic device 101 may store the fingerprint information in operation 621. Accordingly, the user may register both the security information and fingerprint information by a single input.

Figure 6C:
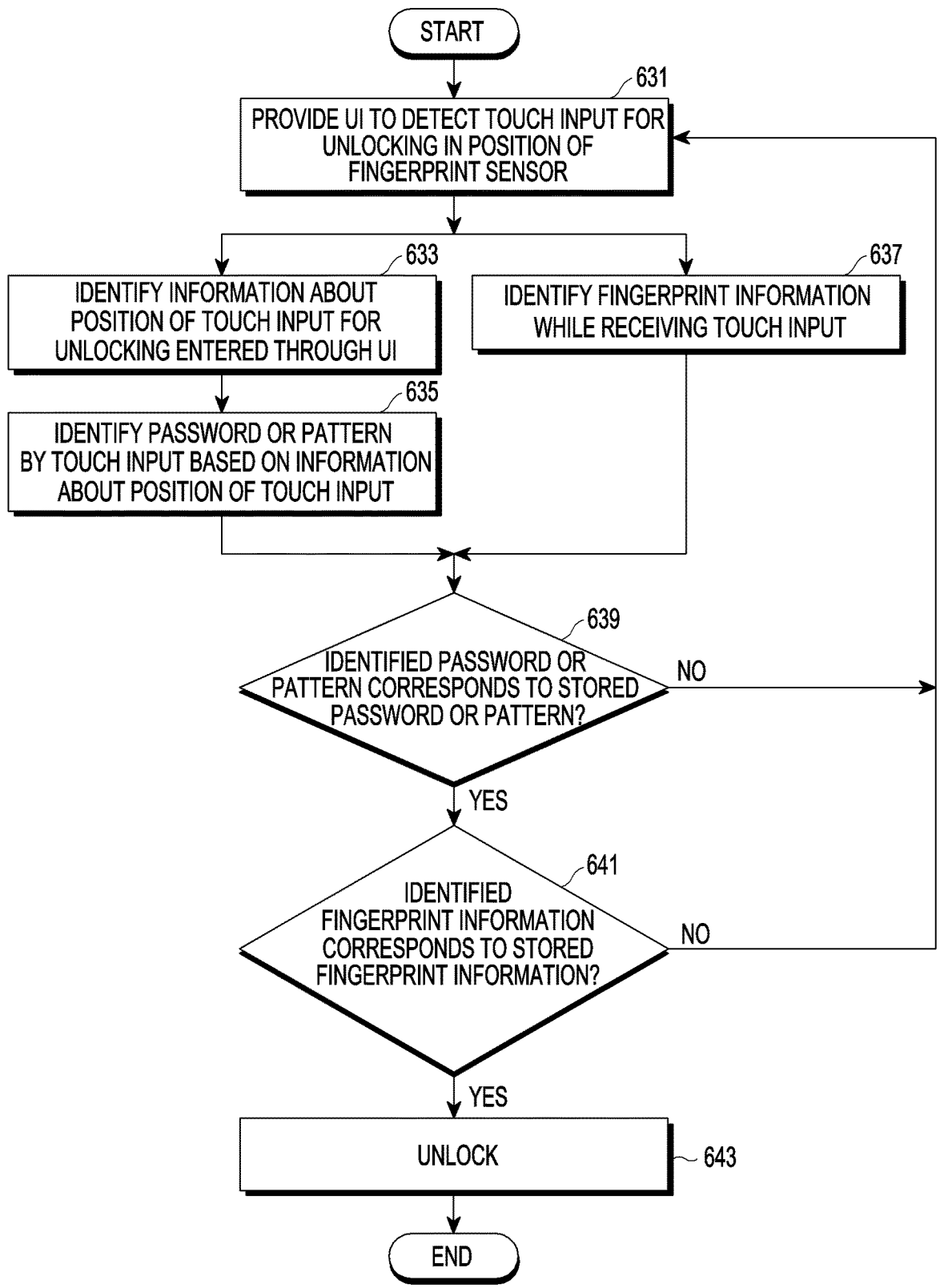

FIG. 6C is a flowchart illustrating a method for operating an electronic device according to an embodiment of the disclosure.

Referring to FIG. 6C, the electronic device 101 may provide a user interface for detecting a touch input for unlocking in the position of the fingerprint sensor 144 in operation 631. In operation 633, the electronic device 101 may identify information about the position of the touch input for unlocking which is entered to the user interface. For example, the processor 120 may receive information about the position of each of at least one single touch or each of consecutive touches from the TSP 142. In operation 635, the electronic device 101 may identify the password or pattern by the touch input based on the information about the position of the touch input. For example, the electronic device 101 may identify the password or pattern by the touch input based on the identified position of the touches, the position of the objects designated upon entry of the pattern or the position of each icon for designating the numbers constituting the displayed user interface. In the pattern entry scheme, the electronic device 101 may further identify the order of entry of the pattern. In operation 637, the electronic device 101 may identify the fingerprint information while receiving the touch input.

In operation 639, the electronic device 101 may identify whether the identified password or pattern corresponds to the stored password or pattern. Further, the electronic device 101 may identify whether the identified fingerprint information corresponds to the stored fingerprint information in operation 641. Upon determining that the identified password or pattern corresponds to the stored password or pattern and the identified fingerprint information corresponds to the stored fingerprint information, the electronic device 101 may perform unlocking in operation 643. Where the identified password or pattern does not correspond to the stored password or pattern or where the identified fingerprint information does not correspond to the stored fingerprint information, the electronic device 101 may display the user interface for unlocking. According to an embodiment of the disclosure, where the identified password or pattern corresponds to the stored password or pattern but the identified fingerprint information does not correspond to the stored fingerprint information, the electronic device 101 may display a user interface for requesting the re-entry of fingerprint information. Where the fingerprint information identified later corresponds to the stored fingerprint information, the electronic device 101 may determine that user authentication succeeds and perform unlocking.

Figure 7A:
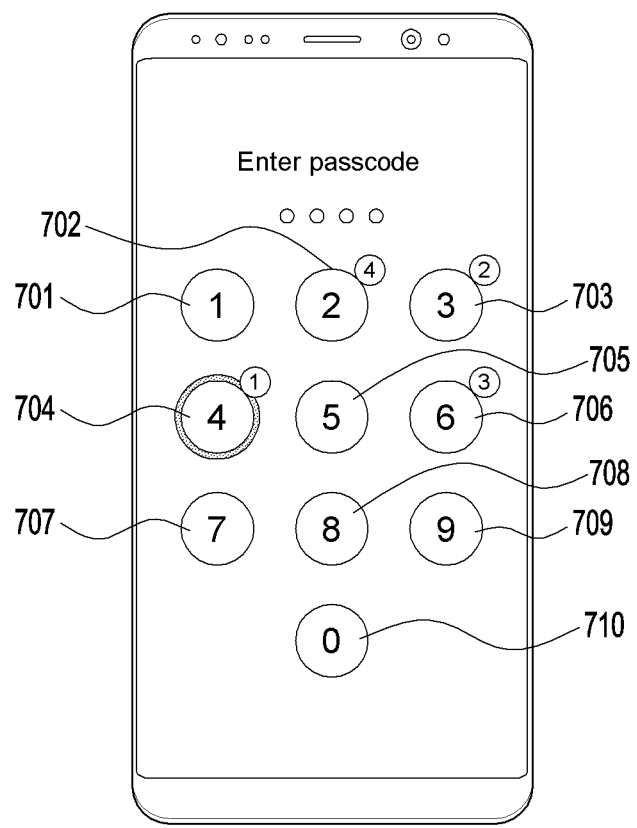
FIGS. 7A and 7B are views illustrating examples of user interfaces for entry of passwords according to an embodiment of the disclosure.
Figure 7B:
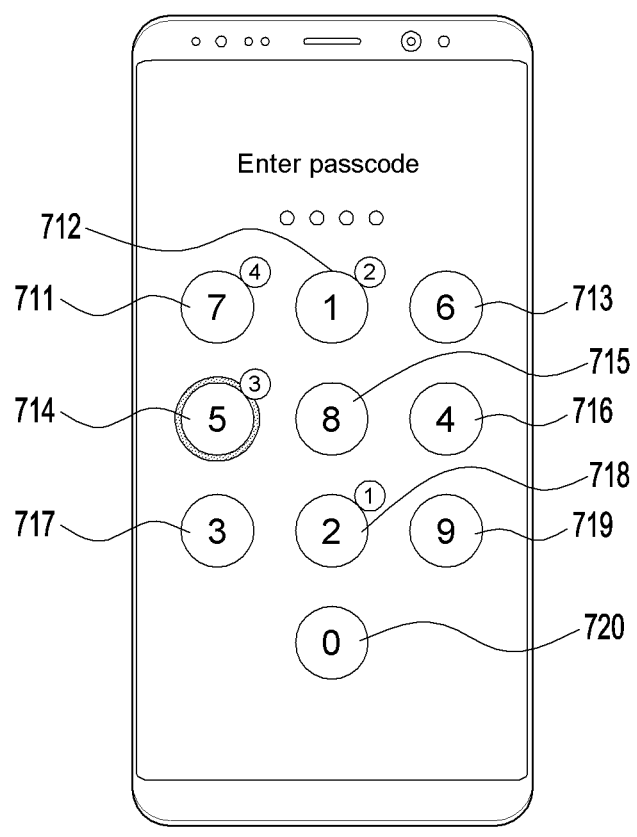

FIGS. 7A and 7B are views illustrating examples of user interfaces for entry of passwords according to an embodiment of the disclosure.

Referring to FIG. 7A, the electronic device 101 may array icons 701 to 710 constituting a user interface based on the position of the fingerprint sensor 144 and a stored password. In this figure, icon 701 corresponds to a '1' user numeric input key, icon 702 corresponds to a '2' user numeric input key, icon 703 corresponds to a '3' user numeric input key, icon 704 corresponds to a '4' user numeric input key, icon 705 corresponds to a '5' user numeric input key, icon 706 corresponds to a '6' user numeric input key, icon 707 corresponds to a '7' user numeric input key, icon 708 corresponds to an '8' user numeric input key, icon 709 corresponds to a '9' user numeric input key, and icon 710 corresponds to a '0' user numeric input key. For example, it is assumed in FIG. 7A that the fingerprint sensor 144 is positioned in an area of the display where an icon 704 for designating number 4 is displayed. Where a preset password is "4362," the electronic device 101 may display an icon 704 for designating number 4 which corresponds to a portion, i.e., 4, of the password, corresponding to the position of the fingerprint sensor 144. Accordingly, where the user sequentially touches the icon 704, icon 703, icon 706, and icon 702 to enter the password, "4362," the electronic device 101 may identify that the entered security information is "4362" based on the position of each touch. Further, the fingerprint sensor 144 may identify the fingerprint information while the user touches the icon 704. The electronic device 101 may perform user authentication based on, at least, whether the identified security information corresponds to stored security information and whether the identified fingerprint information corresponds to stored fingerprint information.

FIG. 7B illustrates a user interface when the password is changed from "4362" to "2157." In this figure, icon 711 corresponds to a '7' user numeric input key, icon 712 corresponds to a '1' user numeric input key, icon 713 corresponds to a '6' user numeric input key, icon 714 corresponds to a '5' user numeric input key, icon 715 corresponds to an '8' user numeric input key, icon 716 corresponds to a '4' user numeric input key, icon 717 corresponds to a '3' user numeric input key, icon 718 corresponds to a '2' user numeric input key, icon 719 corresponds to a '9' user numeric input key, and icon 720 corresponds to a '0' user numeric input key. Where the password is changed to "2157," and the user sequentially touches icon 702, icon 701, icon 705, and icon 707 to enter the security information on the user interface of the device 101. In this case, as indicated in FIG. 7A, the fingerprint sensor 144 which is intended to sense the fingerprint information about the area where the icon 704 is displayed, cannot sense the fingerprint information because the new password "2157" does not include a touch on the icon 704.

The electronic device 101 may display an icon 714 for designating at least a portion (e.g., 5) of the changed password "2157," on an area of the display corresponding to the position of the fingerprint sensor 144. The electronic device 101 may display the remaining icons 711 to 713 and 715 to 720 on the remaining areas. Accordingly, the fingerprint sensor 144 may identify the fingerprint information while the user touches the icon 714 for entry of the password "2157."

In the embodiments of FIGS. 7A and 7B, the electronic device 101 may deploy the icons (e.g., 701 to 710 or 711 to 720) in the same layout and set different arrays depending on the password. However, changing the array is merely an example. For example, the electronic device 101 may change the size or shape of the icons for designating the security information so that the fingerprint sensor 144 may identify the fingerprint information when the user touches a corresponding icon. Alternatively, the electronic device 101 may change the overall position of the icons while leaving the icons (e.g., 701 to 710) in the same array. For example, where the password is changed to "2156," the electronic device 101 may relocate the icons 701 to 710 in a lower area while maintaining the array of the icons 701 to 710 of FIG. 7A. For example, the electronic device 101 may move all of the icons 701 to 710 down so that the icon 701 for designating number 1 is displayed on the area corresponding to the position of the fingerprint sensor 144. Thus, the fingerprint sensor 144 may identify the fingerprint information while the user touches the icon 701 for designating number 1 for entry of the security information, "2157." Although a process has been described above in which the electronic device 101 handles a password constituted of numbers, the electronic device 101 may provide a user interface shaped as a keyboard with letters to enable entry of a password including letters, according to an embodiment of the disclosure. In this case, the keyboard may contain numbers as well as letters, so that the electronic device 101 may receive and process a password constituted of a combination of letters and numbers.

Figure 8:
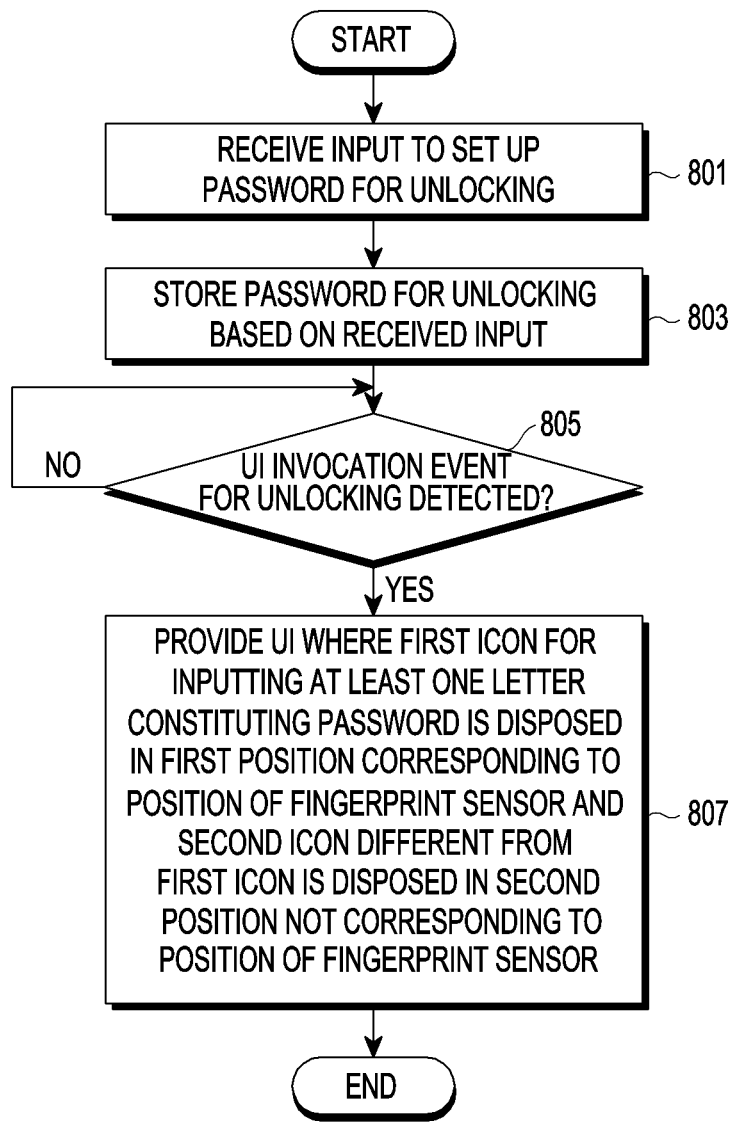
FIG. 8 is a flowchart illustrating a method for operating an electronic device according to an embodiment of the disclosure.

FIG. 8 is a flowchart illustrating a method for operating an electronic device according to an embodiments of the disclosure.

Referring to FIG. 8, the electronic device 101 may receive an input for setting up a password for unlocking in operation 801. In operation 803, the electronic device 101 may store the password for unlocking based on the received input. In operation 805, the electronic device 101 may determine whether an event to invoke a user interface for unlocking is detected. For example, the event to invoke the user interface may be an event to be able to wake up the electronic device 101 that is now in a sleep mode. Upon determining that an event to invoke the user interface for unlocking is detected, the electronic device 101 may provide a user interface where a first icon for inputting at least one letter constituting the password is disposed in a first position corresponding to the position of the fingerprint sensor and a second icon different from the first icon is disposed in a second position not corresponding to the position of the fingerprint sensor in operation 807.

Figure 9:
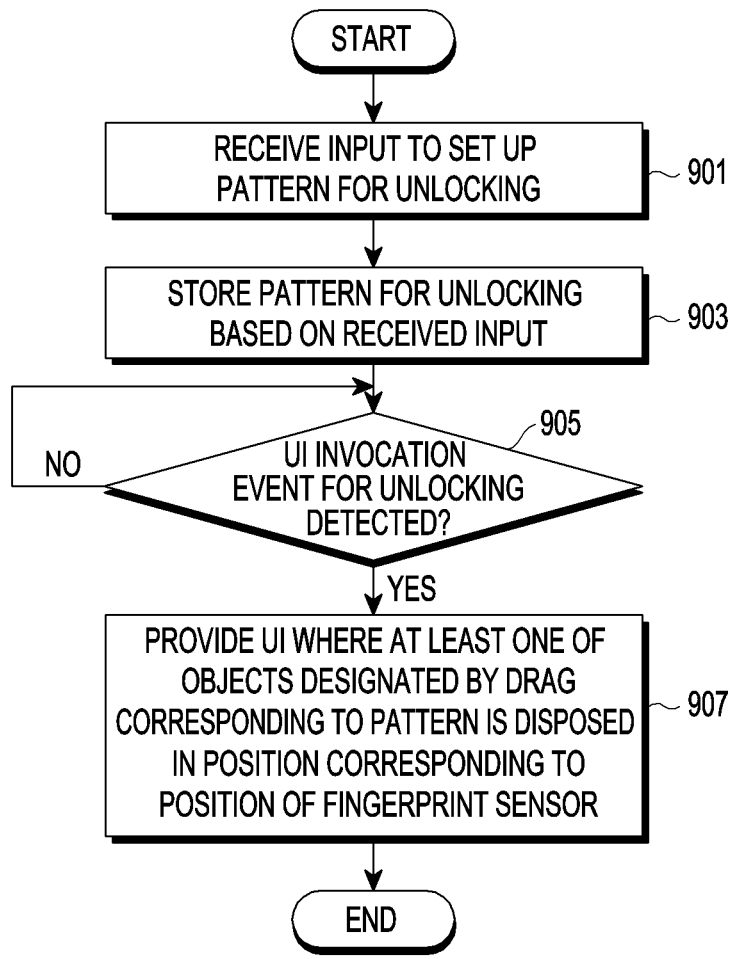
FIG. 9 is a flowchart illustrating a method for operating an electronic device according to an embodiment of the disclosure.

FIG. 9 is a flowchart illustrating a method for operating an electronic device according to an embodiment of the disclosure. The embodiment of FIG. 9 is described in further detail with reference to FIGS. 10A and 10B.

Figure 10A:
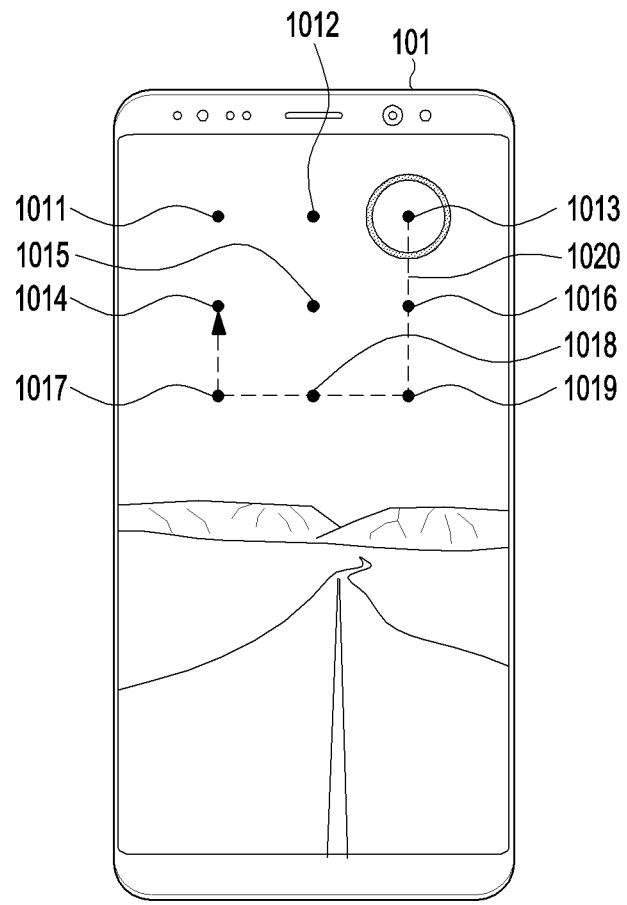
FIGS. 10A and 10B are views illustrating examples of user interfaces for unlocking according to an embodiment of the disclosure.
Figure 10B:
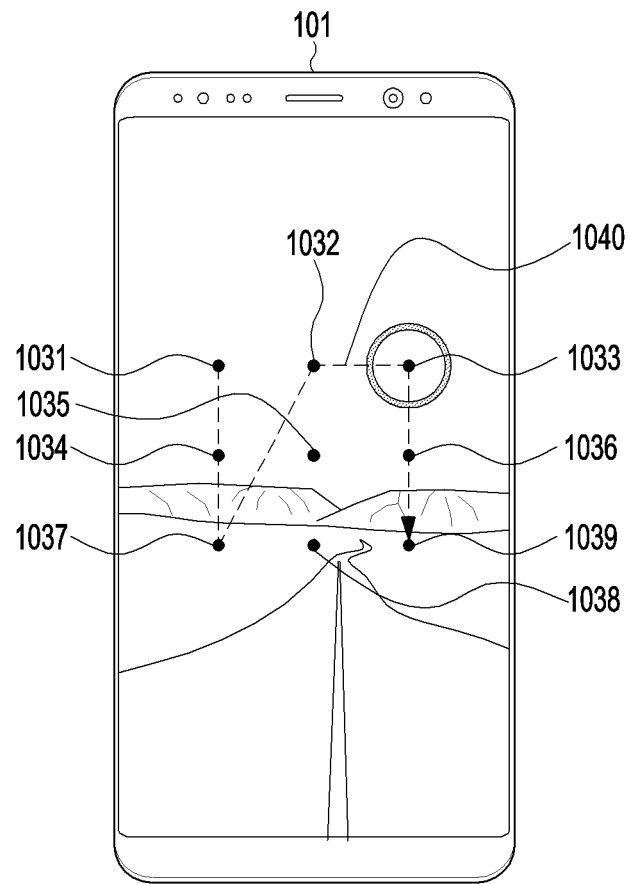

FIGS. 10A and 10B are views illustrating examples of user interfaces for unlocking according to an embodiment of the disclosure.

Referring to FIG. 9, the electronic device 101 may receive an input for setting up a pattern for unlocking in operation 901. In operation 903, the electronic device 101 may store the pattern for unlocking based on the received input. For example, the electronic device 101 may display a user interface including a plurality of objects arrayed in a grid. The electronic device 101 may detect a drag gesture, i.e., consecutive touch inputs, of consecutively selecting at least some of the plurality of objects arranged in a grid. The electronic device 101 may store information about the designated objects according to the consecutive touch inputs and the security information about the order of inputting the designated objects.

In operation 905, the electronic device 101 may determine whether an event to invoke a user interface for unlocking is detected. Upon determining that the event to invoke the user interface for unlocking is detected, the electronic device 101 may provide a user interface where at least one of visual items designated by the drag corresponding to the pattern is disposed in the position corresponding to the position of the fingerprint sensor 144 in operation 907.

Referring to FIGS. 10A and 10B, the electronic device 101 may display a plurality of objects 1011 to 1019 that may be designated by the drag input for the pattern input. The objects may be arranged, for example, in a 3×3 grid with objects 1011, 1012, and 1013 in a first row, objects 1014, 1015, and 1016 in a second row, and objects 1017, 1018, and 1019 in a third row. For example, the stored pattern 1020 may be one to designate the third object 1013, the sixth object 1016, the ninth object 1019, the eighth object 1018, the seventh object 1017, and the fourth object 1014 in the order thereof. The electronic device 101 may determine the position of the plurality of objects 1011 to 1019 so that at least one of the objects 1013, 1016, 1019, 1018, 1017, and 1014 constituting the pattern is positioned on the display area corresponding to the position of the fingerprint sensor 144.

For example, the electronic device 101 may display a plurality of objects 1031 to 1039 that may be designated by the drag input for the pattern input as shown in FIG. 10B. The objects may be arranged, for example, in a 3×3 grid with objects 1031, 1032, and 1033 in a first row, objects 1034, 1035, and 1036 in a second row, and objects 1037, 1038, and 1039 in a third row. It is assumed in FIG. 10B that the position of the fingerprint sensor 144 differs from the position in FIG. 10A. Further, the stored pattern 1040 may be one to designate the first object 1031, the fourth object 1034, the seventh object 1037, the second object 1032, the third object 1033, the sixth object 1036, and the ninth object 1039 in the order thereof. The electronic device 101 may determine the position of the plurality of objects 1031 to 1039 so that at least one of the objects 1031, 1034, 1037, 1032, 1033, 1036, and 1039 constituting the pattern is positioned on the display area corresponding to the position of the fingerprint sensor 144.

Figure 11:
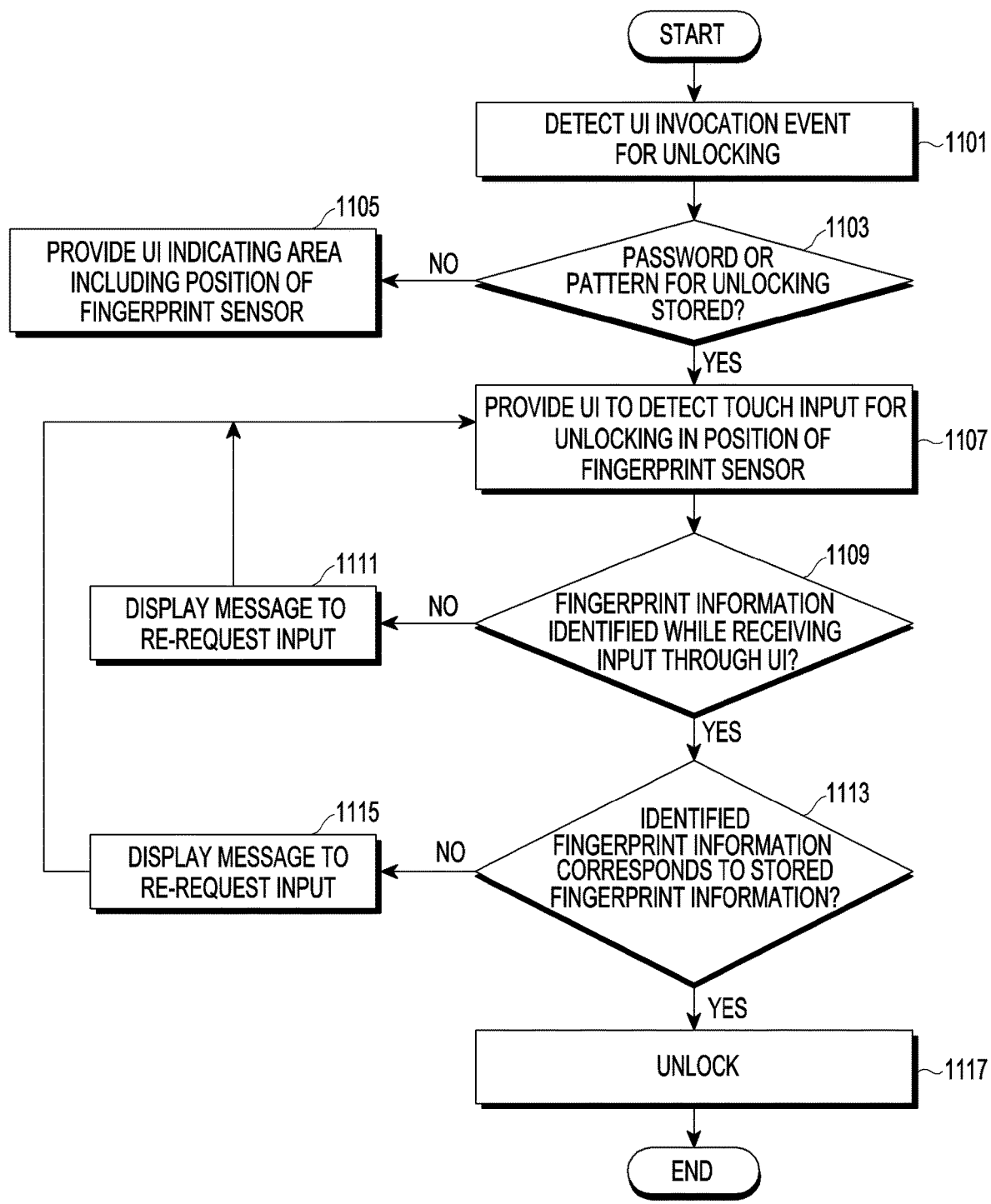
FIG. 11 is a flowchart illustrating a method for operating an electronic device according to an embodiment of the disclosure.

FIG. 11 is a flowchart illustrating a method for operating an electronic device according to an embodiment of the disclosure. The embodiment related to FIG. 11 is described in greater detail with reference to FIG. 12.

Figure 12:
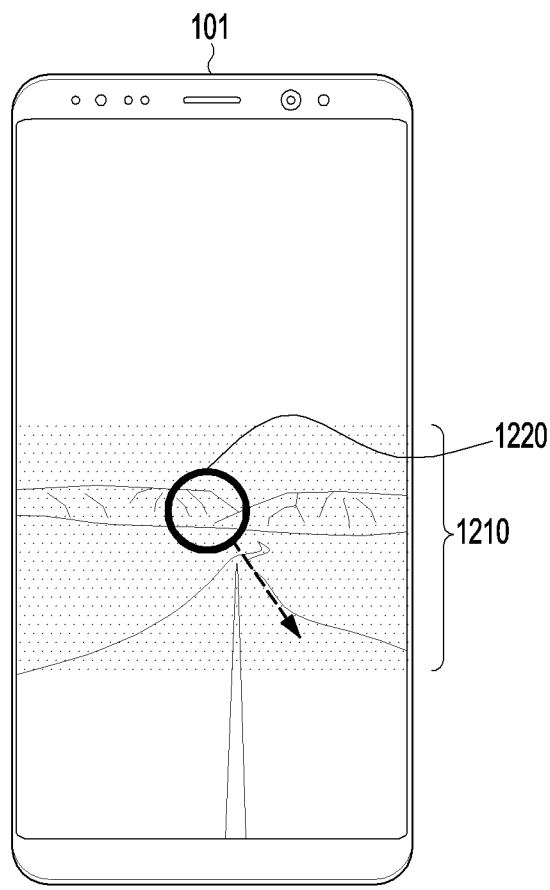
FIG. 12 is a view illustrating a user interface displayed on an electronic device according to an embodiment of the disclosure.

FIG. 12 is a view illustrating a user interface displayed on an electronic device according to an embodiment of the disclosure.

Referring to FIG. 11, the electronic device 101 may detect an event to invoke a user interface for unlocking in operation 1101. For example, the electronic device 101 may detect an event to wake up from the sleep mode as the event to invoke the user interface for unlocking. In operation 1103, the electronic device 101 may identify whether a password or pattern for unlocking has been set up and stored.

Where no password or pattern is previously set up, the electronic device 101 may display a user interface indicating an area including the position of the fingerprint sensor in operation 1105. For example, the electronic device 101 may display an area 1210 for identifying fingerprint information distinctly from the other areas as shown in FIG. 12. For example, the electronic device 101 may display the area 1210 for identifying fingerprint information in a different color, transparency, or brightness than the other areas. Accordingly, the user may perceive the entry of a touch 1220 on the corresponding area and enter the touch 1220 on the area. Although not shown, the electronic device 101 may display a message to induce the user to enter a touch on the area 1210 where fingerprint information may be identified. The electronic device 101 may perform unlocking as per the entry of the touch 1220 and the authentication based on the fingerprint information. The area 1210 for identifying fingerprint information may be determined depending on the position of the fingerprint sensor.

Where a password or pattern for unlocking has been stored, the electronic device 101 may provide a user interface for detecting a touch input for unlocking in the position of the fingerprint sensor in operation 1107. In operation 1109, the electronic device 101 may identify whether fingerprint information is identified while an input on the user interface is received. When the fingerprint information is not identified, the electronic device 101 may display a message to request re-entry and provide a user interface for detecting a touch input for unlocking in operation 1111. When the fingerprint information is identified, the electronic device 101 may identify whether the identified fingerprint information corresponds to stored fingerprint information in operation 1113. Unless the identified fingerprint information corresponds to the stored fingerprint information, the electronic device 101 may display a message to request re-entry in operation 1115. When the identified fingerprint information corresponds to the stored fingerprint information, the electronic device 101 may perform unlocking in operation 1117.

Figure 13A:
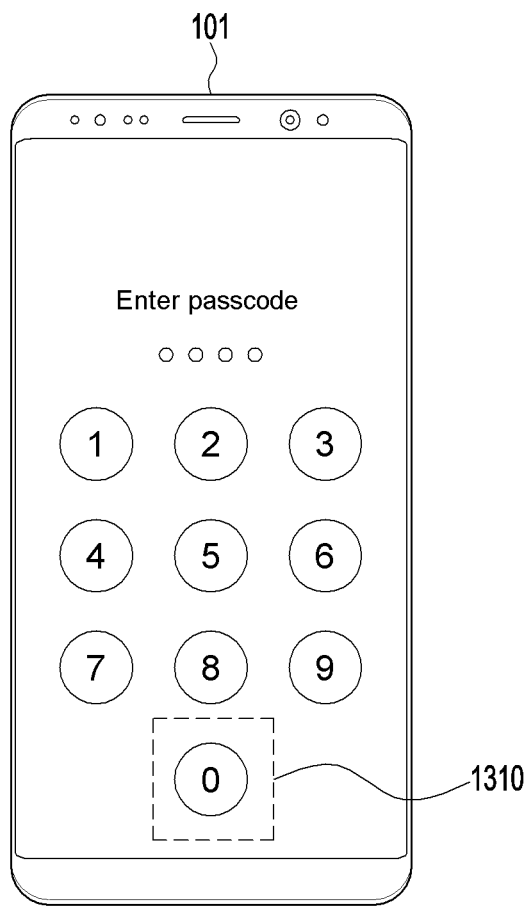
FIGS. 13A, 13B, and 13C are views illustrating a fingerprint perception area according to an embodiment of the disclosure.
Figure 13B:
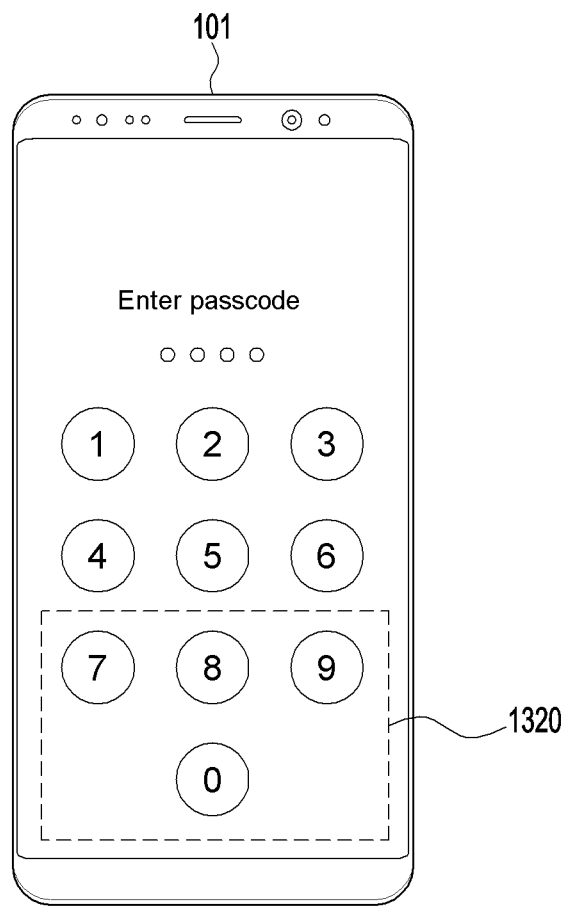
Figure 13C:
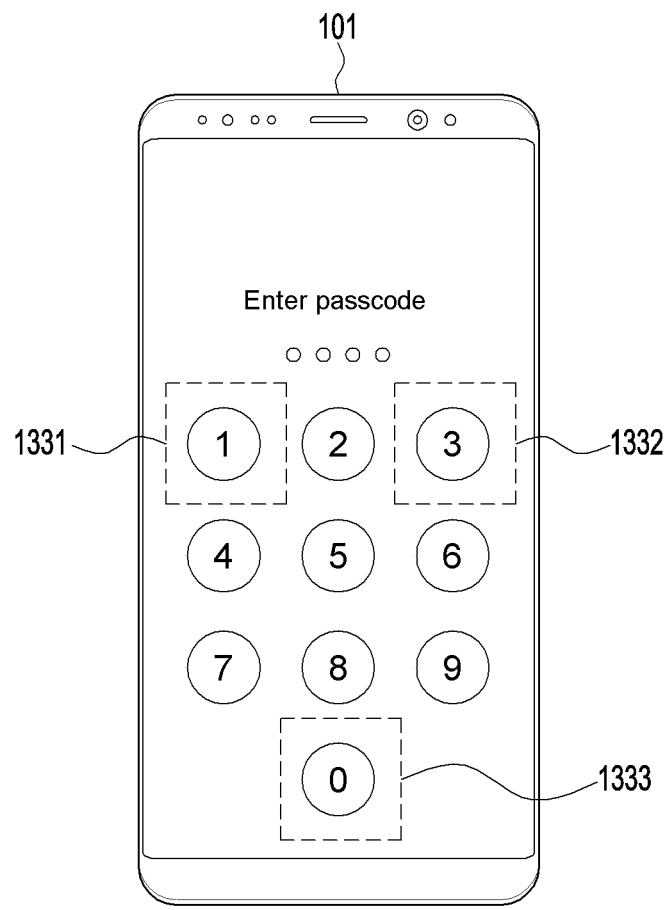

FIGS. 13A, 13B, and 13C are views illustrating a fingerprint perception area according to an embodiment of the disclosure.

Referring to FIG. 13A, the electronic device 101 may identify fingerprint information on a first area 1310 of the display that may include one icon for designating a number. For example, the electronic device 101 may identify fingerprint information while the icon displayed on the first area 1310 of the display is designated.

Referring to FIG. 13B, the electronic device 101 may identify fingerprint information on a second area 1320 of the display that may include four icons for designating numbers. For example, the electronic device 101 may identify fingerprint information while at least one of the icons displayed on the second area 1320 of the display is designated. According to an embodiment of the disclosure, the electronic device 101 may configure the icons displayed on the second area 1320 as icons for designating numbers constituting a password. Hence, the electronic device 101 may obtain a plurality of fingerprint images for a plurality of touches and identify the fingerprint information based on the plurality of fingerprint images.

Referring to FIG. 13C, the electronic device 101 may identify fingerprint information on a third area 1331, a fourth area 1332, and a fifth area 1333 of the display that may include one icon for designating a number. For example, the electronic device 101 may identify fingerprint information while at least one of the icons displayed on the third area 1331, the fourth area 1332, and the fifth area 1333 of the display is designated. According to an embodiment of the disclosure, the electronic device 101 may configure the icons displayed on the third area 1331, the fourth area 1332, and the fifth area 1333 as icons for designating numbers constituting a password. Hence, the electronic device 101 may obtain a plurality of fingerprint images for a plurality of touches and identify the fingerprint information based on the plurality of fingerprint images.

Figure 14:
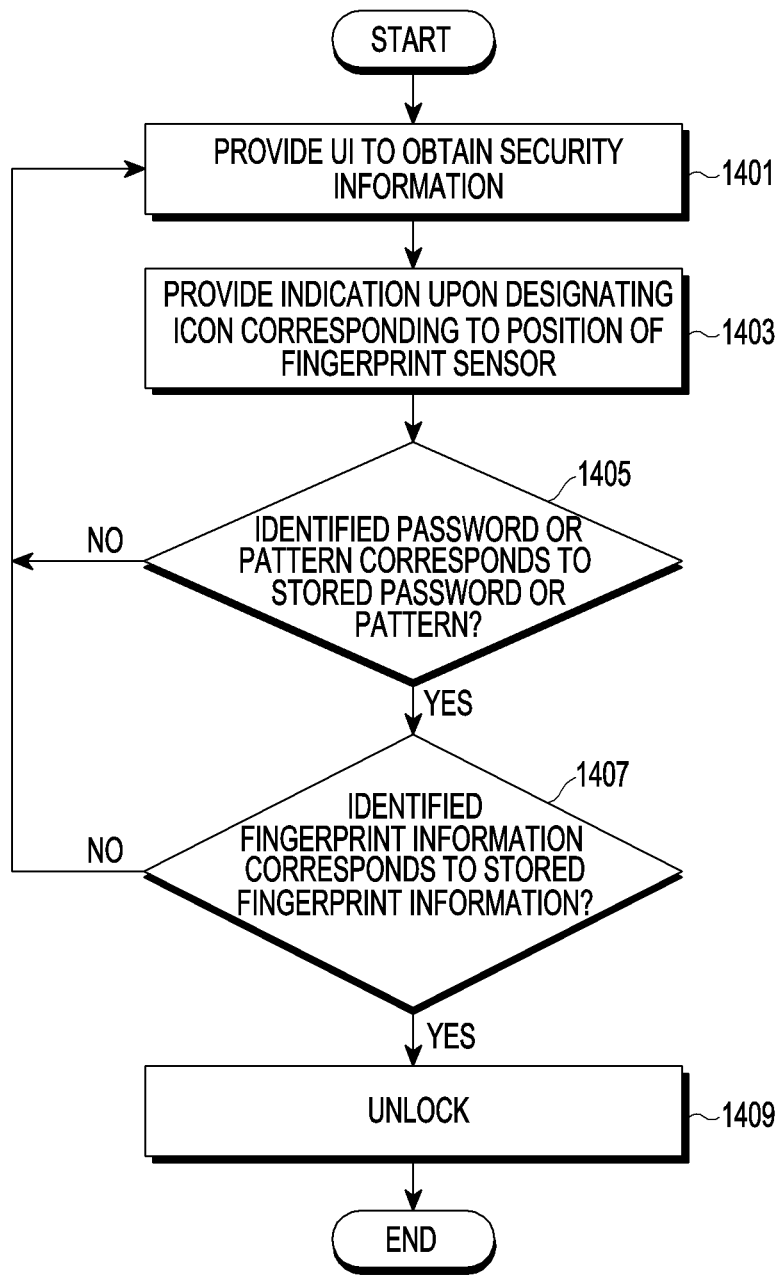
FIG. 14 is a flowchart illustrating a method for operating an electronic device according to an embodiment of the disclosure.

FIG. 14 is a flowchart illustrating a method for operating an electronic device according to an embodiment of the disclosure.

Referring to FIG. 14, the electronic device 101 may provide a user interface for obtaining security information in operation 1401. As set forth above, the electronic device 101 may provide a user interface for designating visual items corresponding to security information in an area corresponding to the position of the fingerprint sensor. In operation 1403, the electronic device 101 may provide an indication when the icon corresponding to the position of the fingerprint sensor is designated. For example, where the "icon for designating number 1" is displayed on the area corresponding to the position of the fingerprint sensor, and the "icon for designating number 1" is touched, the electronic device 101 may display the corresponding icon distinctly from the other icons. Or, the electronic device 101 may output a vibration or voice when the "icon for designating number 1" is designated. Thus, the user may perceive that the electronic device 101 obtains the fingerprint information when the corresponding icon is designated, thus enabling correct fingerprint information to be entered when the corresponding icon is touched.

In operation 1405, the electronic device 101 may identify whether the identified password or pattern corresponds to the stored password or pattern. When the identified password or pattern corresponds to the stored password or pattern, the electronic device 101 may identify whether the identified fingerprint information corresponds to the stored fingerprint information in operation 1407. When the identified fingerprint information corresponds to the stored fingerprint information, the electronic device 101 may perform unlocking in operation 1409. Where the identified password or pattern does not correspond to the stored password or pattern or where the identified fingerprint information does not correspond to the stored fingerprint information, the electronic device 101 may display back the user interface for obtaining security information.

Figure 15:
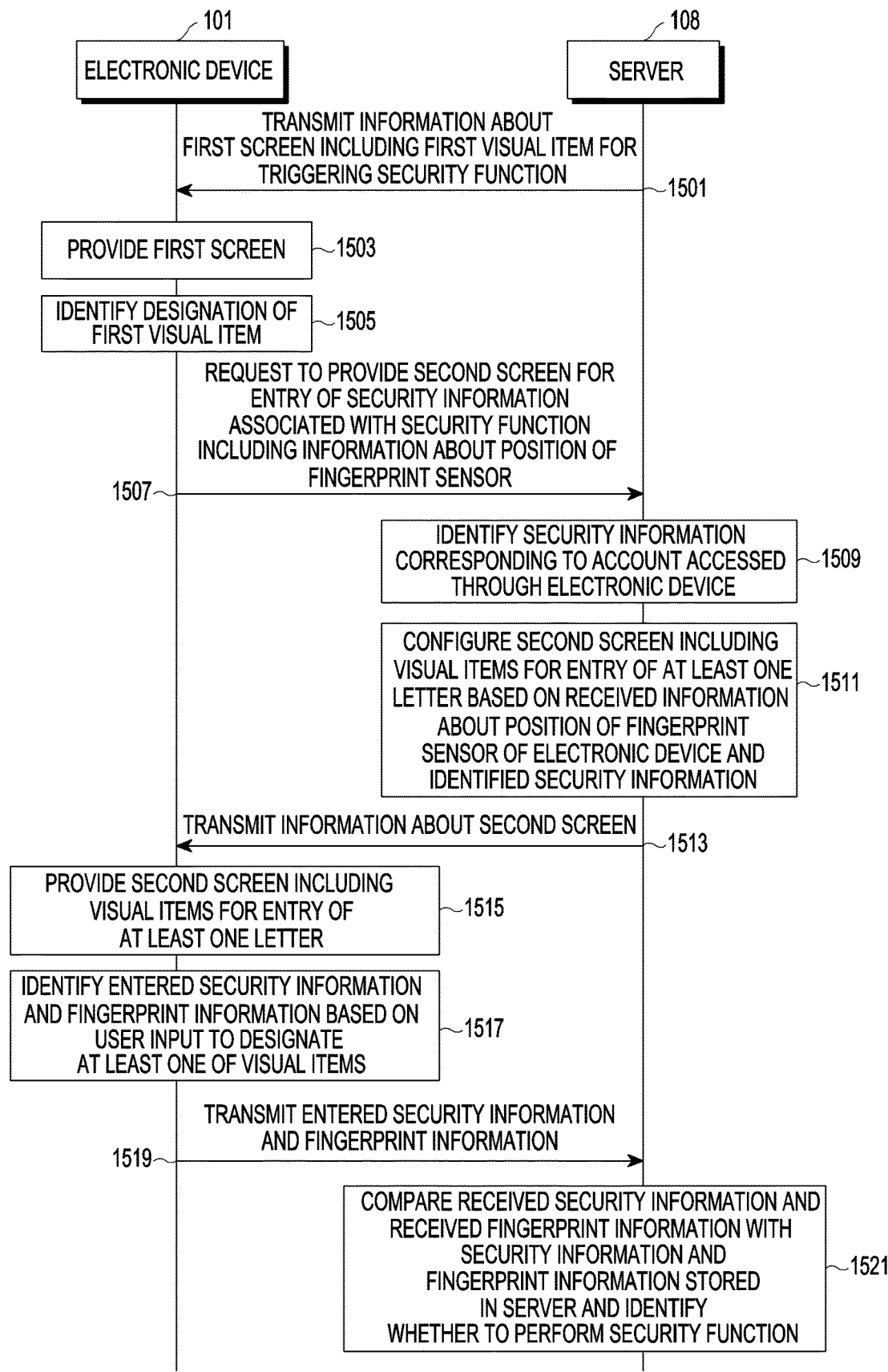
FIG. 15 is a flowchart illustrating a method for operating an electronic device and a server according to an embodiment of the disclosure.

FIG. 15 is a flowchart illustrating a method for operating an electronic device and a server according to an embodiment of the disclosure.

Figure 16A:
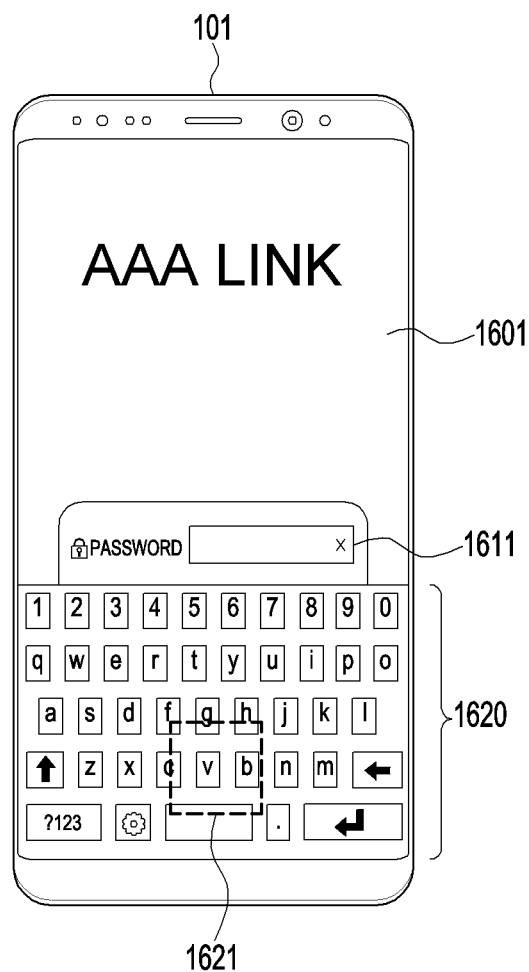
FIGS. 16A, 16B, and 16C are views illustrating a fingerprint sensing area of an electronic device according to an embodiment of the disclosure.
Figure 16B:
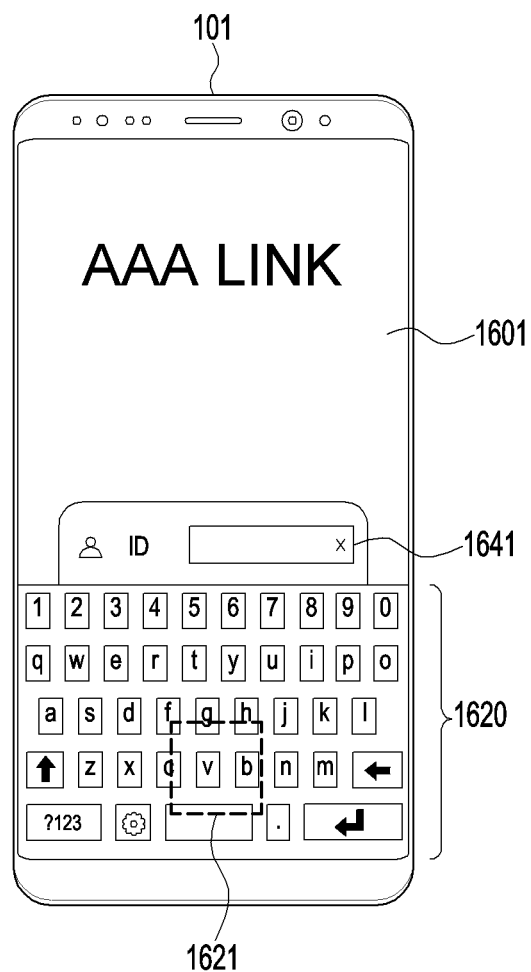
Figure 16C:
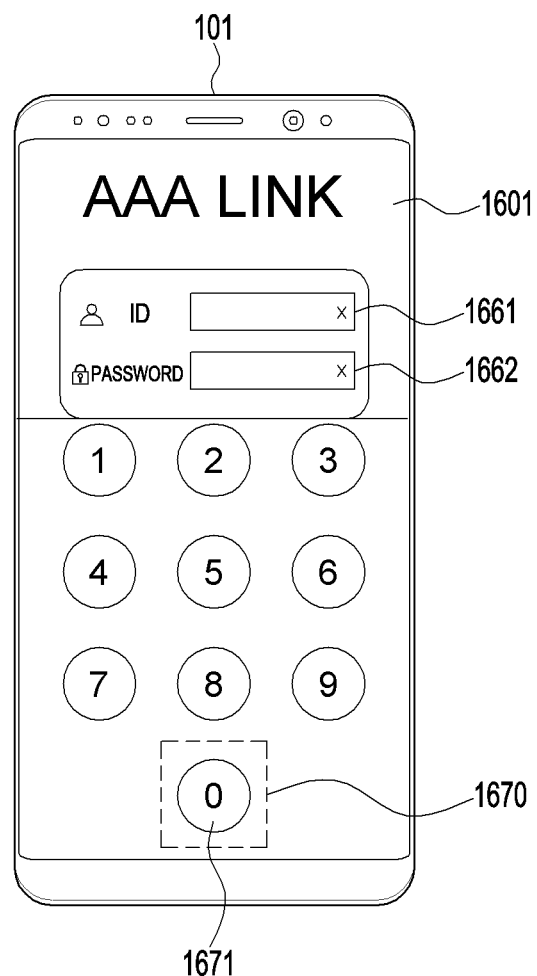

FIGS. 16A, 16B, and 16C are views illustrating a fingerprint sensing area of an electronic device according to an embodiment of the disclosure.

Referring to FIG. 15, a server 108 may transmit information about a first screen including a first visual item for triggering a security function in operation 1501. In this case, the electronic device 101 may further include a communication module capable of communicating data with the server 108. The communication module may establish a direct (e.g., wired) communication channel or a wireless communication channel between the electronic device 101 and the server 108 or support communication through the established communication channel. The communication module may include one or more communication processors that are operable independently from the processor 120 (e.g., the application processor (AP)) and supports a direct (e.g., wired) communication or a wireless communication. According to an embodiment, the communication module may include a wireless communication module (e.g., a cellular communication module, a short-range wireless communication module, or a global navigation satellite system (GNSS) communication module) or a wired communication module (e.g., a local area network (LAN) communication module or a power line communication (PLC) module). A corresponding one of these communication modules may communicate with the external electronic device via the first network (e.g., a short-range communication network, such as Bluetooth™, Wi-Fi direct, or infrared data association (IrDA)) or the second network (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module may identify and authenticate the electronic device 101 in a communication network, such as the first network or the second network, using subscriber information (e.g., international mobile subscriber identity (IMSI)) stored in the subscriber identification module.

In operation 1503, the electronic device 101 may provide a first screen. In operation 1505, the electronic device 101 may identify a designation of a first visual item. For example, the first screen may be a screen for a payment request, and the first visual item may be a payment request icon. In operation 1507, the electronic device 101 may send, to the server 108, a request for a second screen for entry security information associated with the security function including the information about the position of the fingerprint sensor. The electronic device 101 may include, in the request, information about an area of the display, where the fingerprint sensor may identify the fingerprint information, and send the request to the server 108. According to an embodiment of the disclosure, the server 108 may identify identification information or information about an area where the fingerprint information corresponding to the identification information may be identified. Also in this case, the electronic device 101 may abstain from sending the information about the area where the fingerprint information may be identified to the server and may send only the request for the second screen to the server 108.

In operation 1509, the server 108 may identify security information (e.g., password, passcode, or pattern) corresponding to the account that is accessed through the electronic device 101. For example, the server 108 may store security information in association with its respective account. It may be assumed that the electronic device 101 has previously sent account information to the server 108. The server 108 may identify the security information based on the account that is accessed through the electronic device 101 from the stored information.

In operation 1511, the server 108 may configure a second screen including visual items for entry of at least one letter based on the information about the position of the fingerprint sensor of the electronic device received (or identified) and the identified security information. For example, where the password corresponding to the account is identified as a string including "b" or "v," the server 108 may configure the second screen so that visual items for entry of the letter "b" or "v" are arranged on the area corresponding to the position of the fingerprint sensor of the electronic device 101. In operation 1513, the server 108 may transmit information about the second screen to the electronic device 101.

In operation 1515, the electronic device 101 may provide the second screen including visual items for entry of at least one letter based on the received information. For example, the electronic device 101 may provide the second screen 1601 based on the information received from the server 108 as shown in FIG. 16A. The second screen 1601 may include a window 1611 for displaying the password entered and visual items 1620 for entry of letters. Visual items for entry of at least one letter constituting the password may be displayed on the area 1621 corresponding to the position of the fingerprint sensor of the electronic device 101. In operation 1517, the electronic device 101 may identify the entered security information and fingerprint information based on a user input for designating at least one of the visual items. For example, the electronic device 101 may identify the fingerprint information while touching the visual item disposed on the area 1621 corresponding to the position of the fingerprint sensor. In operation 1519, the electronic device 101 may transmit the entered security information and fingerprint information. In operation 1521, the server 108 may compare the received security information and the received fingerprint information with the security information and fingerprint information stored in the server, identifying whether to perform the security function. When the received information corresponds to the stored information, the server 108 may perform the security function. Unless the received information corresponds to the stored information, the server 108 may send, to the electronic device 108, information indicating that performing the security function has failed.

Referring to FIG. 16B, the electronic device 101 may display a window 1641 for entry of account information (i.e., ID). In this case, visual items (e.g., "b" or "v") for designating at least some of the letters constituting the account information may be displayed on the area 1621 corresponding to the position of the fingerprint sensor 144. The electronic device 101 may display visual items for designating at least some of the letters constituting the account information on the area 1621 corresponding to the position of the fingerprint sensor 144 based on the account information previously stored. Or, the electronic device may receive the account information from the server 108 and may display visual items for designating at least some of the letters constituting the account information on the area 1621 corresponding to the position of the fingerprint sensor 144 based on the received account information.

Referring to FIG. 16C, the electronic device may display a window 1661 for entry of account information and a window 1662 for receiving a password. The electronic device 101 may display an icon 1671 for designating a number constituting the password on the area 1670 corresponding to the position of the sensor 144.

Figure 17:
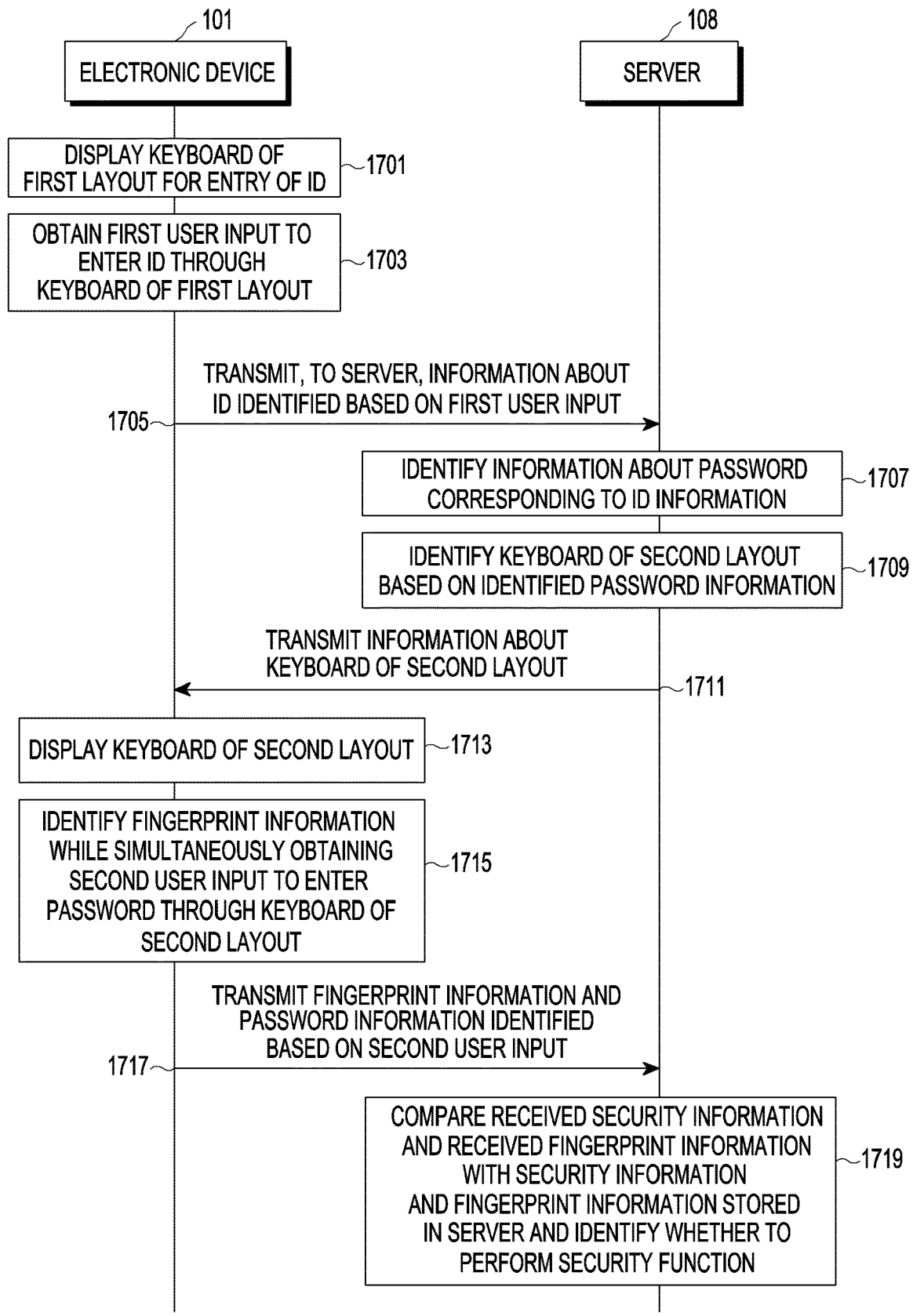
FIG. 17 is a flowchart illustrating a method for operating an electronic device and a server according to an embodiment of the disclosure.

FIG. 17 is a flowchart illustrating a method for operating an electronic device and a server according to an embodiment of the disclosure.

Referring to FIG. 17, the electronic device 101 may display a keyboard of a first layout for entry an ID in operation 1701. In operation 1703, the electronic device 101 may obtain a first user input for entry of the ID through the keyboard of the first layout. In operation 1705, the electronic device 101 may transmit, to the server 108, information about the ID identified based on the first user input. Although failing to receive a request to send the ID information from the user, if the entry of the ID is determined to have been complete, the electronic device 101 may send the ID information to the server 108.

In operation 1707, the server 108 may identify information about the password corresponding to the ID information. As set forth above, the server 108 may store association information about the password corresponding to each ID. The server 108 may identify the password information corresponding to the received ID information among the association information. In operation 1709, the server 108 may identify a keyboard of a second layout based on the identified password information. In operation 1711, the server 108 may transmit information about the keyboard of the second layout to the electronic device 101. In operation 1713, the electronic device 101 may display the keyboard of the second layout. In operation 1715, the electronic device 101 may identify fingerprint information while simultaneously obtaining a second user input for entry of password information through the keyboard of the second layout. In operation 1717, the electronic device may transmit, to the server 108, the fingerprint information and password information identified based on the second user input. In operation 1719, the server 108 may compare the received security information and the received fingerprint information with the security information and fingerprint information stored in the server, identifying whether to perform the security function.

Figure 18:
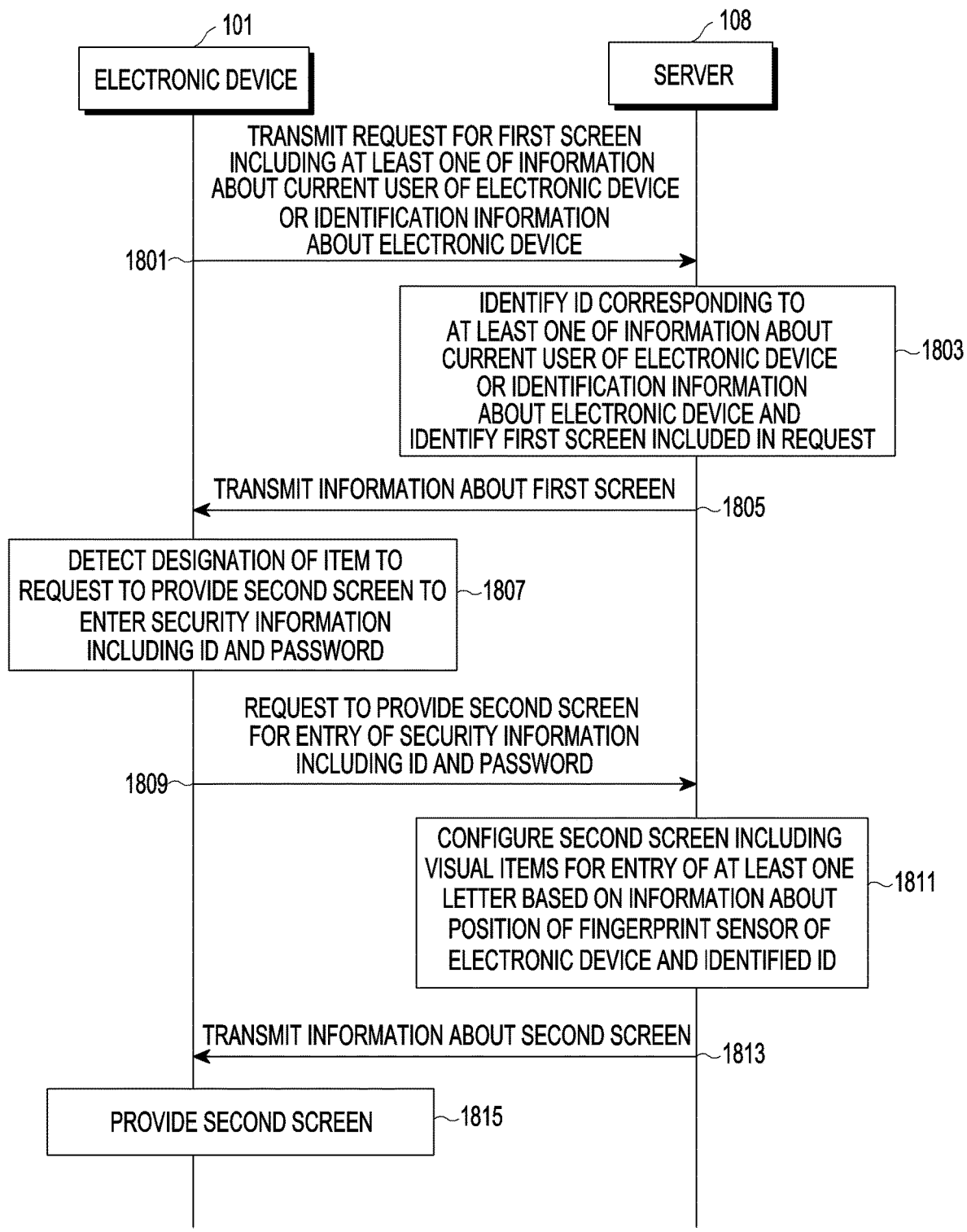
FIG. 18 is a flowchart illustrating a method for operating an electronic device and a server according to an embodiment of the disclosure.

FIG. 18 is a flowchart illustrating a method for operating an electronic device and a server according to an embodiment of the disclosure.

Referring to FIG. 18, the electronic device 101 may transmit, to the server 108, a request for a first screen including at least one of information about the current user of the electronic device or identification information about the electronic device in operation 1801. In other words, the electronic device 101 may access the server 108 to request the first screen while sending the information about the current user or the identification information about the electronic device 101. In operation 1803, the server 108 may identify an ID corresponding to at least one of the information about the current user of the electronic device or the identification information about the electronic device 101 and identify the first screen included in the request. In operation 1805, the server 108 may transmit information about the first screen to the electronic device 101. In operation 1807, the electronic device 101 may detect a designation of an item for sending a request for a second screen for entry of security information including an ID and a password. In operation 1809, the electronic device 101 may send a request for the second screen for entry of the security information including the ID and the password to the server 108.

In operation 1811, the server 108 may configure a second screen including visual items for entry of at least one letter based on the information about the position of the fingerprint sensor of the electronic device and the identified ID. For example, the server 108 may configure the second screen to allow the visual items for designating at least some of the letters constituting the identified ID may be displayed on the area corresponding to the position of the fingerprint sensor of the electronic device 101. In operation 1813, the server 108 may transmit information about the second screen to the electronic device 101. The electronic device 101 may provide the second screen in operation 1815. Thus, the electronic device 101 may identify the user's fingerprint information while simultaneously receiving the ID. Unless the fingerprint information is identified, the electronic device 101 may provide a user interface for obtaining fingerprint information and obtain fingerprint information through the corresponding user interface.

Figure 19:
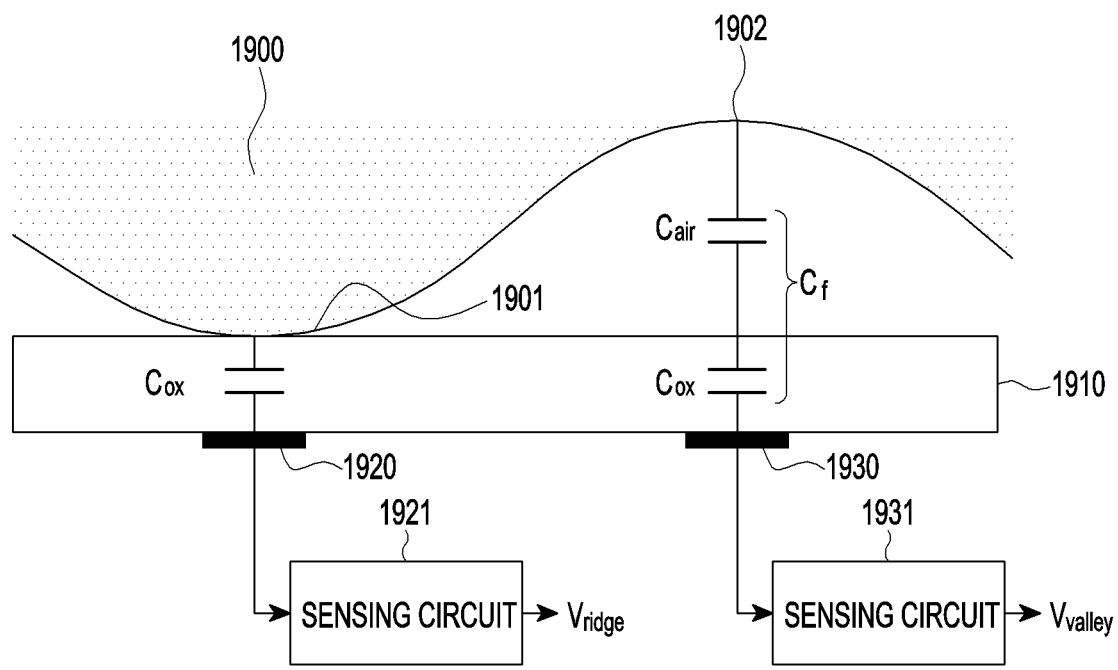
FIG. 19 is a view illustrating an example of sensing fingerprint information based on a capacitance according to an embodiment of the disclosure.

FIG. 19 is a view illustrating an example of sensing fingerprint information based on a capacitance according to an embodiment of the disclosure.

Figure 20:
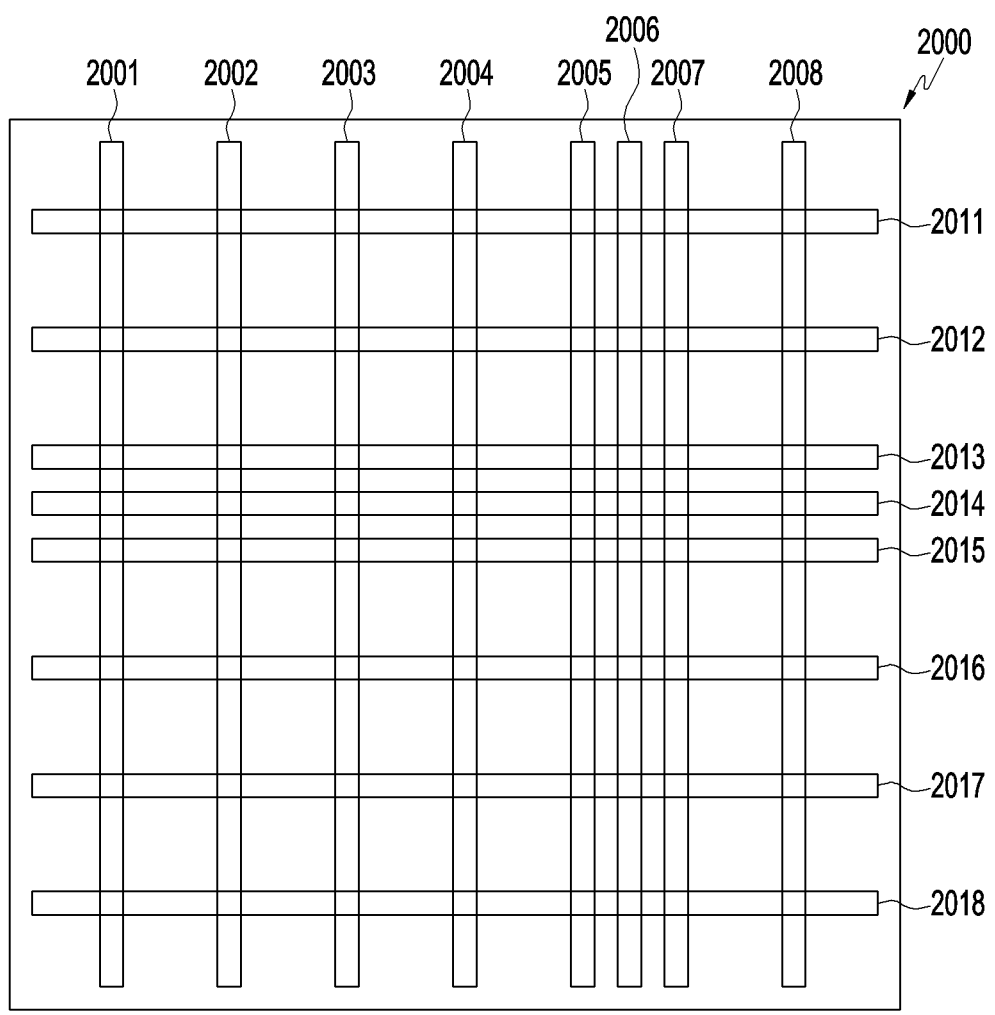
FIG. 20 is a view illustrating electrodes of a TSP of an electronic device according to an embodiment of the disclosure.

FIG. 20 is a view illustrating electrodes of a TSP of an electronic device according to an embodiment of the disclosure.

Referring to FIG. 19, at least one electrode 1920 and 1930 may be displayed on a TSP 1910 of an electronic device 101. For example, a capacitance Cox may be formed between a first electrode 1920 and a ridge 1901 of a finger 1900, and a capacitance Cf may be formed between a second electrode 1920 and a valley 1902 of the finger 1900. The capacitance Cf may be formed by a serial connection between the capacitance Cox and a capacitance Cair. Due to a difference in capacitance, a voltage sensed by a sensing circuit 1921 may differ from a voltage Vvalley sensed by a sensing circuit 1931. However, the electrodes are required to be arranged corresponding to the distance between the valley and ridge of the fingerprint. Thus, according to an embodiment of the disclosure, the electronic device 101 may include a TSP 2000 as shown in FIG. 20. The TSP 2000 may include electrodes 2001 to 2008, for example, vertical electrodes 2001, 2002, 2003, 2004, 2005, 2006, 2007, and 2008, and electrodes 2011 to 2019, for example, horizontal electrodes 2011, 2012, 2013, 2014, 2015, 2016, 2017, and 2018. In the TSP 2000, the distance between the electrodes 2005, 2006, and 2007 may be shorter than the distance between the electrodes 2001, 2002, and 2003. The distance between the electrodes 2013, 2014, and 2015 may be shorter than the distance between the electrodes 2016, 2017, and 2018. Hence, the electrodes 2005, 2006, and 2007 and the electrodes 2001, 2002, and 2003 may be used to sense fingerprint information. According to an embodiment of the disclosure, the electronic device 101 may provide a user interface including visual items for designating at least a portion of security information on an area corresponding to the positions of the electrodes 2005, 2006, and 2007 and the electrodes 2001, 2002, and 2003.

Various embodiments as set forth herein may be implemented as software (e.g., the program) containing commands that are stored in a machine (e.g., computer)-readable storage medium (e.g., an internal memory) or an external memory. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner According to various embodiments, operations performed by modules, programs, or other components may be carried out sequentially, in parallel, repeatedly, or heuristically, or at least some operations may be executed in a different order or omitted, or other operations may be added.

As is apparent from the foregoing description, according to various embodiments of the disclosure, there may be provided an electronic device and method for operating the same, which may provide a user interface through which fingerprint information may be obtained upon entry of security information through the touchscreen based on the security information stored. The electronic device and its operational method enable obtaining fingerprint information simultaneously with entry of, e.g., a password or pattern.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
 a display;
 a fingerprint sensor disposed corresponding to a first area of the display;
 a touchscreen panel disposed corresponding to the display; and
 at least one processor configured to:
  receive, from the touchscreen panel, information about a position of a first touch input for setting up first security information for unlocking the electronic device,
  identify the first security information based at least in part on the information about the position of the first touch input, and
  control the display to display a user interface for unlocking the electronic device,
 wherein the user interface for unlocking the electronic device comprises visual items for unlocking the electronic device,
 wherein a plurality of visual items among the visual items correspond to the first security information, the plurality of visual items including at least one first visual item and at least one second visual item, the first security information including a first part and a second part, and wherein the plurality of visual items are arranged such that the at least one first visual item corresponding to the first part is displayed on the first area of the display corresponding to a position of the fingerprint sensor, and the at least one second visual item corresponding to the second part is displayed on a second area of the display other than the first area.

2. The electronic device of claim 1, further comprising:
a memory configured to store the first security information and first fingerprint information about a user,
wherein the at least one processor is further configured to:
receive, from the touchscreen panel, information about a position of a second touch input on the user interface for unlocking the electronic device,
identify second security information corresponding to the second touch input based at least in part on the information about the position of the second touch input, and
identify second fingerprint information through the fingerprint sensor while the at least one first visual item positioned on the first area is touched while the second touch input is inputted.

3. The electronic device of claim 2, wherein the at least one processor is further configured to identify the first fingerprint information while the first touch input is inputted or based on a third touch input through a user interface for inputting a fingerprint.

4. The electronic device of claim 2, wherein the at least one processor is further configured to determine whether to unlock the electronic device based at least in part on a result of comparing the first security information stored in the memory with the identified second security information and a result of comparing the first fingerprint information stored in the memory with the identified second fingerprint information.

5. The electronic device of claim 2, wherein the at least one processor is further configured to output an indication related to the at least one first visual item to distinguish the at least one first visual item from another visual item of the visual items.

6. The electronic device of claim 1,
wherein the first security information includes a plurality of numbers, the plurality of numbers including at least one first number and at least one second number, and
wherein the at least one first visual item corresponding to the at least one first number is displayed on the first area, and
wherein the at least one second visual item corresponding to the at least one second number is displayed on the second area.

7. The electronic device of claim 1,
wherein the visual items are arranged in a designated layout, and
wherein the at least one processor is further configured to locate the at least one first visual item in the designated layout according to the first security information for configuring the user interface for unlocking the electronic device.

8. The electronic device of claim 1,
wherein the first security information includes pattern information including an order of designating a plurality of objects, the plurality of objects including at least one first object and at least one second object,
wherein the user interface for unlocking the electronic device comprises the objects, and
wherein the at least one first object of the plurality of objects is arranged on the first area and the at least one second object is arranged on the second area of the display other than the first area.

9. The electronic device of claim 8,
wherein the objects are arranged in a designated layout, and
wherein the at least one processor is further configured to locate the designated layout such that the at least one first object is positioned on the first area according to the first security information to configure the user interface for unlocking the electronic device.

10. The electronic device of claim 1,
wherein the first security information includes a plurality of letters, the plurality of letters including at least one first letter and at least one second letter,
wherein the at least one first visual item corresponding to the at least one first letter is displayed on the first area, and
wherein the at least one second visual item corresponding to the at least one second letter is displayed on the second area.

11. The electronic device of claim 1, wherein the at least one first visual item is visually distinguished to identify the first visual item to a user.

12. A method for operating an electronic device including a display, a fingerprint sensor disposed corresponding to a first area of the display, and a touchscreen panel disposed corresponding to the display, the method comprising:
receiving, from the touchscreen panel, information about a position of a first touch input for setting up first security information for unlocking the electronic device;
identifying the first security information based at least in part on information about the position of the first touch input; and
displaying, through the display, a user interface for unlocking the electronic device,
wherein the user interface for unlocking the electronic device comprises visual items for unlocking the electronic device,
wherein a plurality of visual items among the visual items correspond to the first security information, the plurality of visual items including at least one first visual item and at least one second visual item, the first security information including a first part and a second part, and
wherein the plurality of visual items are arranged such that the at least one first visual item corresponding to the first part is displayed on the first area of the display corresponding to a position of the fingerprint sensor, and the at least one second visual item corresponding to the second part is displayed on a second area of the display other than the first area.

13. The method of claim 12, further comprising:
storing the first security information and first fingerprint information about a user;
identifying second security information corresponding to a second touch input based at least in part on information about a position of the second touch input, the second touch input being inputted through the user interface for unlocking the electronic device and identified by the touchscreen panel; and identifying second fingerprint information through the fingerprint sensor while the at least one first visual item positioned on the first area is touched while the second touch input is inputted.

14. The method of claim 13, further comprising identifying the first fingerprint information while the first touch input is inputted or based on a third touch input through a user interface for inputting a fingerprint.

15. The method of claim 13, further comprising identifying whether to unlock the electronic device based at least in part on a result of comparing the first security information stored in a memory with the identified second security information and a result of comparing the first fingerprint information stored in the memory with the identified second fingerprint information.

16. The method of claim 13, further comprising outputting an indication related to the at least one first visual item distinguishing the at least one first visual item from another visual item of the visual items.

17. The method of claim 12,
wherein the first security information includes a plurality of numbers, the plurality of numbers including at least one first number and at least one second number,
wherein the at least one first visual item corresponding to the at least one first number is displayed on the first area, and
wherein the at least one second visual item corresponding to the at least one second number is displayed on the second area.

18. The method of claim 12,
wherein the visual items are arranged in a designated layout, and
wherein the method further comprises locating the at least one first visual item in the designated layout according to the first security information to configure the user interface for unlocking the electronic device.

19. The method of claim 12,
wherein the first security information includes pattern information including an order of designating a plurality of objects, the plurality of objects including at least one first object and at least one second object,
wherein the user interface for unlocking the electronic device comprises the objects, and
wherein the at least one first object of the plurality of objects is arranged on the first area and the at least one second object is arranged on the second area of the display other than the first area.

20. The method of claim 19,
wherein the objects are arranged in a designated layout, and
wherein the method further comprises locating the designated layout so that the at least one first object is positioned on the first area according to the first security information to configure the user interface for unlocking the electronic device.

21. The method of claim 12,
wherein the first security information includes a plurality of letters, the plurality of letters including at least one first letter and at least one second letter,
wherein the at least one first visual item corresponding to the at least one first letter is displayed on the first area, and
wherein the at least one second visual item corresponding to the at least one second letter is displayed on the second area.

22. An electronic device, comprising:
a communication module;
a display;
a fingerprint sensor disposed corresponding to a first area of the display;
a touchscreen panel disposed corresponding to the display; and
at least one processor configured to:
receive, through the communication module, first information about a first screen including a first object for triggering a security function received from a server,
control the display to display the first screen including the first object based on the first information,
transmit, through the communication module to the server, a request for a second screen for inputting first security information associated with the security function in response to detecting a designation of the first object identified based on information from the touchscreen panel,
receive, from the server through the communication module, second information about the second screen, and
control the display to display the second screen,
wherein the second screen comprises visual items for unlocking the electronic device,
wherein a plurality of visual items among the visual items correspond to the first security information, the plurality of visual items including at least one first visual item and at least one second visual item, the first security information including a first part and a second part, and
wherein the plurality of visual items are arranged such that the at least one first visual item corresponding to the first part is displayed on the first area of the display corresponding to a position of the fingerprint sensor, and the at least one second visual item corresponding to the second part is displayed on a second area of the display other than the first area.

23. The electronic device of claim 22, wherein the at least one processor is further configured to transmit, through the communication module to the server, information about the first area of the display corresponding to the position of the fingerprint sensor.

24. The electronic device of claim 22, wherein the at least one processor is further configured to transmit, through the communication module to the server, account information inputted through the first screen.

25. The electronic device of claim 24,
wherein the plurality of visual items are related to a password corresponding to the account information, and
wherein the at least one first visual item corresponding to a portion of the password is displayed on the first area.

26. The electronic device of claim 22,
wherein the at least one processor is further configured to:
transmit, through the communication module to the server, at least one of identification information about the electronic device or information about a user of the electronic device, and
receive, from the server through the communication module, the second information about the second screen, and
wherein the plurality of visual items are related to at least one of a password or account information corresponding to at least one of the information about the user of the electronic device or the identification information about the electronic device identified by the server.

27. A method for operating an electronic device including a communication module, a display, a fingerprint sensor disposed corresponding to a first area of the display, and a touchscreen panel disposed corresponding to the display, the method comprising:
- receiving, through the communication module, first information about a first screen including a first object for triggering a security function received from a server;
- displaying, through the display, the first screen including the first object based on the first information;
- transmitting, through the communication module to the server, a request for a second screen for inputting first security information associated with the security function in response to detecting a designation of the first object identified based on information from the touchscreen panel;
- receiving, from the server through the communication module, second information about the second screen, wherein at least one first visual item for designating at least a portion of the first security information is displayed on the first area of the display corresponding to a position of the fingerprint sensor; and
- displaying, through the display, the second screen,
- wherein the second screen comprises visual items for unlocking the electronic device,
- wherein a plurality of visual items among the visual items correspond to the first security information, the plurality of visual items including at least one first visual item and at least one second visual item, the first security information including a first part and a second part, and
- wherein the plurality of visual items are arranged such that the at least one first visual item corresponding to the first part is displayed on the first area of the display corresponding to a position of the fingerprint sensor, and the at least one second visual item corresponding to the second part is displayed on a second area of the display other than the first area.

28. The method of claim 27, further comprising transmitting, through the communication module to the server, information about the first area of the display corresponding to the position of the fingerprint sensor.

29. The method of claim 27, further comprising transmitting, through the communication module to the server, account information inputted through the first screen.

30. The method of claim 29,
- wherein the plurality of visual items are related to a password corresponding to the account information, and
- wherein the at least one first visual item corresponding to a portion of the password is displayed on the first area.

31. The method of claim 27, further comprising:
- transmitting, through the communication module to the server, at least one of identification information about the electronic device or information about a user of the electronic device,
- wherein receiving the second information about the second screen from the server through the communication module includes receiving, from the server through the communication module, the second information about the second screen, and
- wherein the plurality of visual items are related to at least one of a password or account information corresponding to at least one of the information about the user of the electronic device or the identification information about the electronic device identified by the server.

* * * * *